(12) United States Patent
Premysler

(10) Patent No.: US 8,405,920 B2
(45) Date of Patent: Mar. 26, 2013

(54) ILLUMINATION LENSES

(76) Inventor: Philip Premysler, Boca Raton, FL (US)

( * ) Notice: Subject to any disclaimer, the term of this patent is extended or adjusted under 35 U.S.C. 154(b) by 0 days.

(21) Appl. No.: 13/060,476

(22) PCT Filed: Sep. 4, 2008

(86) PCT No.: PCT/US2008/010359
§ 371 (c)(1),
(2), (4) Date: Feb. 24, 2011

(87) PCT Pub. No.: WO2010/027345
PCT Pub. Date: Mar. 11, 2010

(65) Prior Publication Data
US 2012/0033433 A1 Feb. 9, 2012

(51) Int. Cl.
G02B 17/00 (2006.01)
G02B 13/18 (2006.01)

(52) U.S. Cl. ......... 359/726; 359/359; 359/708; 359/718

(58) Field of Classification Search ................. 359/708, 359/718, 719, 726
See application file for complete search history.

(56) References Cited

U.S. PATENT DOCUMENTS

| 3,978,332 | A | 8/1976 | Goytisolo Taltavull |
| 4,161,014 | A | 7/1979 | Dey et al. |
| 4,161,015 | A | 7/1979 | Dey et al. |
| 5,971,551 | A * | 10/1999 | Winston et al. ............... 359/868 |
| 7,273,299 | B2 | 9/2007 | Parkyn et al. |
| 7,731,395 | B2 | 6/2010 | Parkyn et al. |
| 2003/0189832 | A1 | 10/2003 | Rizkin et al. |
| 2007/0058369 | A1 | 3/2007 | Parkyn et al. |
| 2009/0237941 | A1* | 9/2009 | Premysler ................ 362/296.05 |
| 2010/0314985 | A1 | 12/2010 | Premysler |

FOREIGN PATENT DOCUMENTS

WO 2009091562 A2 7/2009

* cited by examiner

Primary Examiner — Scott J Sugarman

(57) ABSTRACT

Illumination lenses having surfaces shaped according to given differential equations in order to distribute light in a highly controlled manner with minimum reflection losses are provided. These lenses also have surfaces angled and arranged in such a way that they can be molded with relatively simple molds.

12 Claims, 12 Drawing Sheets

*Prior Art*

*Prior Art*

FIG. 5
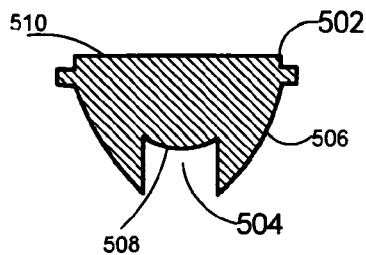
*Prior Art*
FIG. 6
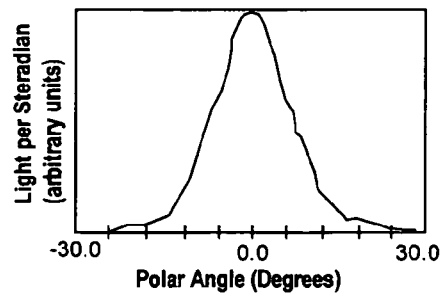
*Prior Art*
FIG. 7  FIG. 8  FIG. 9  FIG. 10
*Prior Art*  *Prior Art*  *Prior Art*  *Prior Art*
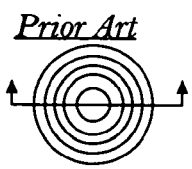  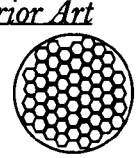 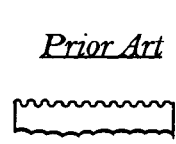
FIG. 11  FIG. 12
*Prior Art*  *Prior Art*
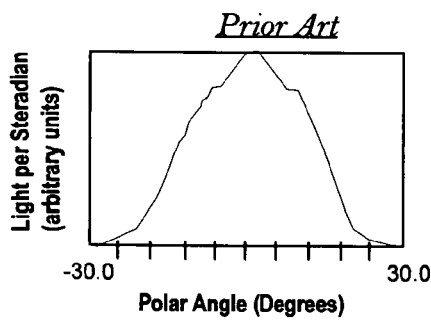 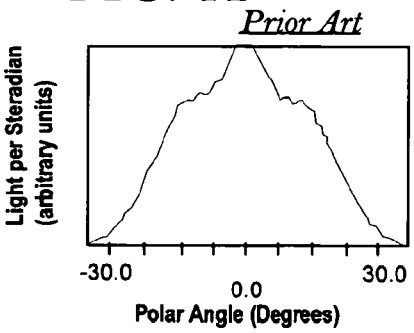
FIG. 13
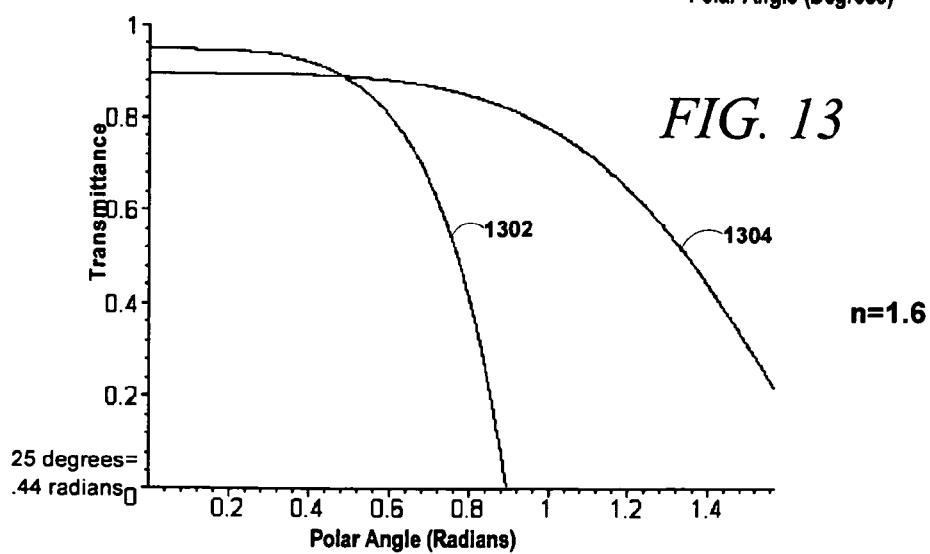

FIG. 14  *Prior Art*
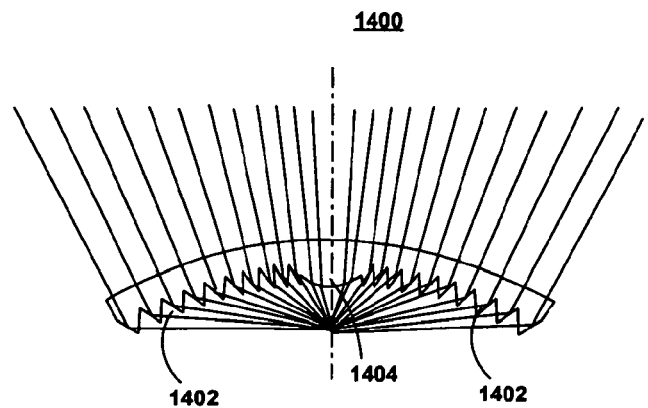
FIG. 15
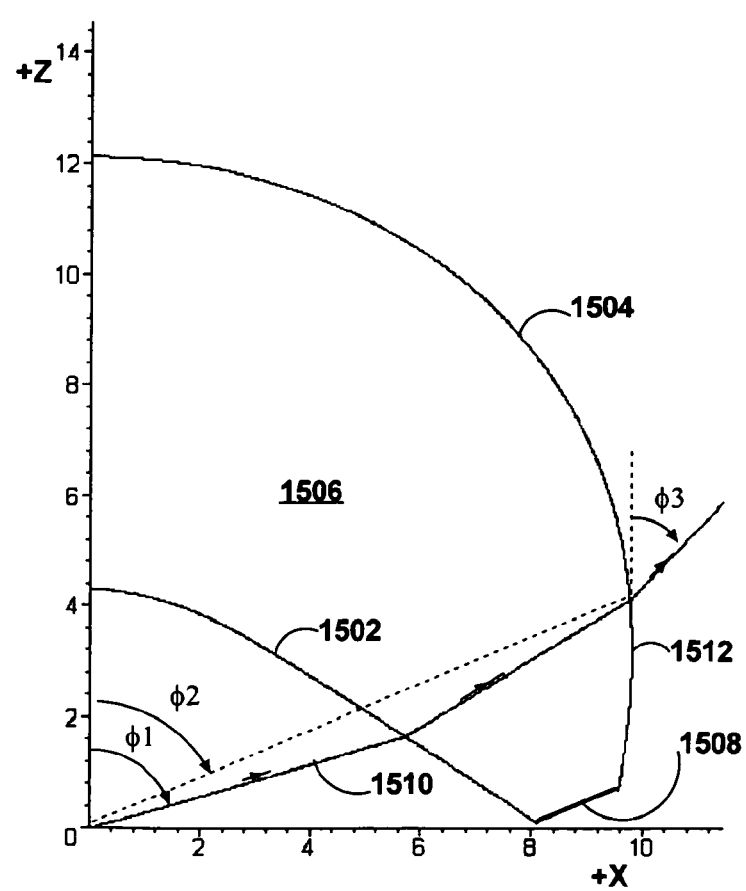

ILLUMINATION LENSES

FIELD OF THE INVENTION

The present invention relates to illumination optics especially suitable for use with Light Emitting Diodes.

BACKGROUND OF THE INVENTION

Traditionally Light Emitting Diodes (LEDs) have primarily been used as indicator lamps in electronic equipment. However recently the power and efficacy (e.g., lumens per watt of electrical power) has been increasing and LEDs have been identified as a possible replacement for inefficient incandescent lamps in certain applications. The light emitting region of an LED is small (e.g., in the range of 2 mm to 0.7 mm across in many cases) which in theory opens up the possibility for highly controlled distribution of light. However many of LED optics developed so far do not produce controlled distributions, rather they typically produce Gaussian like distributions which is the hallmark of somewhat uncontrolled (random) light distribution, and is not ideal for most, if not all applications.

A bare LED chip or an LED chip covered in an encapsulating protective transparent hemisphere, emits light over an entire hemisphere of solid angle, albeit with diminishing intensity at polar angles (zenith angles) approaching $\pi/2$. FIG. 1 is a plot light intensity in arbitrary units as a function of polar angle for a commercial high power LED.

FIG. 2 shows a reflector 202 arranged to collect a portion of light emitted by an LED 204. A problem with using a reflector with an LED that emits over the entire hemisphere of solid angle is that the reflector needs to have an aperture and thus cannot intercept and redirect all of the light. As shown in FIG. 1 light emitted within polar angle range from zero to $\phi$ passes through the aperture of the reflector 202 without redirection or control. Additionally for the reflector 202 to exert detailed control over the emitted light distribution it must be specular as opposed to diffuse, and polishing a reflector sufficiently to make it specular is often expensive.

In an attempt to address the problem posed by the hemispherical range of light output from LED, a type of "primary" optic 302 shown in FIG. 3 has been developed. (This is termed a "primary" optic because it is assumed that it may be used in conjunction with a "secondary" optic such as the reflector 202.) The term "primary optic" may also be taken to mean an optic which has an optical medium of index >1 extending from the LED die so that there are only outer optical surfaces. The primary optic 302 is designed to intercept light emitted by an LED chip which is positioned in a space 304 at the bottom of the primary optic 302 and to redirect the light radially outward, perpendicular to an optical axis 306. The primary optic includes a refracting part 308 and a TIR (Total Internal Reflection) part 310 both of which contribute to redirecting the light. One drawback of the primary optic 302 is that because it includes multiple optical surfaces that contribute to light in the same direction it will increase the effective size of the source (also the étendue), which reduces the controllability of light from the LED. The increased effective size of the source can in some cases be compensated for, by using larger secondary optics but this may be undesirable based on cost and space constraints. By way of loose analogy to imaging optics, the primary optic creates multiple "images" of the LED, e.g., one from the refracting part 308 and one from the TIR part 310.

Although, the primary optic 302 is intended to redirect light perpendicular to the optical axis, in practice light is redirected to a range of angles. This is because the primary optic is small and positioned in close proximity to the LED, and consequently the LED subtends a not-insignificant solid angle from each point of the primary optic, and light received within this finite solid angle is refracted or reflected into a commensurate solid angle. The result is shown in FIG. 4 which is a plot of light intensity vs. polar angle for an LED equipped with the primary optic 302. Although this distribution of light shown in FIG. 4 is not especially suited to any particular application, it is intended to direct light into an angular range that can be intercepted by a secondary optic e.g., reflector 202. The goal is not fully achieved in that the angular distribution of light produced by the primary optic 302 covers a range that extends from zero polar angle and therefore all of the light cannot be intercepted by the reflector 202.

Another presently manufactured commercial optic 502 for LEDs is shown in FIG. 5. In use, an LED (not shown) will be located in a bottom recess 504. This optic 502 is one form of "secondary" optic. A LED with or without the primary optic 302 attached can be used. If used the primary optic will fit inside the bottom recess 504. The secondary optic 502 is made from optical grade acrylic (PMMA) and is completely transparent with no reflective coatings. The optic 502 includes a TIR (Total Internal Reflection) parabolic surface 506 which collects a first portion of light emitted by the LED, and a convex lens surface 508 which collects a remaining portion of the light. Both surfaces 506, 508 are intended to collimate light. As might be expected in actuality the light is distributed in a Gaussian-like angular distribution over a certain angular range which is variously reported as 5 degrees and 10 degrees. The former value may be a FWHM value, and the actual value will vary depending on the exact LED that is used. This design is only useful for a fairly narrow range of specialized applications that require a far-field highly collimated LED spotlight. FIG. 6 shows an angular distribution of light produced by this type of optic. As shown the angular distribution is Gaussian-like not uniform.

In order to get a broader angular distribution of light some form of surface relief pattern can be added to a top surface 510 of the optic 502 which is planar as shown in FIG. 5. Alternatively, the surface relief pattern can be formed on a "tertiary" optic that is attached to the top surface 510. One type of surface relief pattern-concentric rings of convolutions is shown in a plan view in FIG. 7 and in a broken-out sectional elevation view in FIG. 8. Another type of surface relief pattern—an array of lenslets is shown in a plan view in FIG. 9 and in a broken-out sectional elevation view in FIG. 10. FIGS. 11 and 12 show light intensity distributions produced by commercial optics that have the same general design as shown in FIG. 5 but which have top surfaces with a surface relief pattern to broaden the angular distribution. The distribution shown in FIG. 11 is designated as having a 15 degree half-angle pattern and that shown in FIG. 12 a 25 degree half angle pattern.

In fact at 25 degrees such designs are coming up against a limit. The limitation is explained as follows. Given that the optic 502 with a flat surface 510 nearly collimates light to within a nominal 5 degree half angle, it can be inferred that light is incident at the surface 510 at about 5/n degrees, where n is the index of refraction of the optic, which for the sake of the following can be considered zero i.e., collimated. In order to create broader distributions of light, some relief pattern as discussed above is added to the top surface 510. Portions of the relief pattern will be tilted relative to the light rays incident from below, and will therefore refract light out at larger angles than would the flat top surface 510. However, at about 25 degrees, depending on how much light loss will be tolerated a limited is reached—in particular the transmittance of the surface starts to decline rapidly. In this connection it is to be noted that according to Snell's law in order deflect light at a particular angle, say 25 degrees, the angle of incidence on the surface must be considerably larger than 25 degrees. FIG. 13, includes a plot 1302 that represents transmittance versus deflection angle when passing from a medium of index 1.6 (a typical value for visible light optics) into air. The X-axis in FIG. 13 is in radians. At the polar angle of 0.44 which is approximately equal to 25 degrees, the transmittance curve 1302 is already into a decline. The transmittance shown by plot 1302 is better than attained in practice because, at least, it does not take into account reflection losses experienced when light passes into the optic 502 through the bottom recess 504 of the optic. This is evidenced by reports of 90% and 85% efficiency for collimating versions of the optic as shown in FIG. 5, not 96% which is the starting value of plot 1302. In contrast, plot 1304 which applies to illumination lenses according to certain embodiments of the invention accounts for losses at both of two lens surfaces.

FIG. 14 shows another type of optic 1400 that is useful for illumination. This optic includes a saw tooth TIR section 1402 and a central lens portion 1404. The optic 1400 can collect a full hemisphere of emission from a source and forms an illumination pattern with a half-angle divergence (polar angle) about 30 degrees. This lens is disclosed in U.S. Pat. No. 5,577,492. For this type of optic there will be some loss of light from the intended distribution at the corners of the saw tooth pattern, which in practice may not be perfectly sharp due to manufacturing limitations. Additionally, due to its complex shape the cost of machining and polishing molds for injection molding is expected to be high. Additionally the '492 patent does address controlling the distribution of light within angular limits of the beams formed. The optic 1400 is already broad relative to its height. If an attempt were made to broaden the polar angle range of the illumination pattern, the TIR surfaces 1404 would have to be angled at larger angles, making the optic even broader-perhaps impractically broad

BRIEF DESCRIPTION OF THE FIGURES

The present invention will be described by way of exemplary embodiments, but not limitations, illustrated in the accompanying drawings in which like references denote similar elements, and in which:

FIG. 5 is a secondary optic for an LED that produces a somewhat collimated light beam;

FIG. 6 is a plot of light intensity versus polar angle produced by the secondary optic shown in FIG. 5;

FIG. 7 is a top view of a pattern of ring convolutions that are added to a top surface of the secondary optic shown in FIG. 5 in order to obtain a broader angular distribution of light;

FIG. 8 is a broken out sectional view of the pattern of ring convolutions shown in FIG. 7;

FIG. 9 is a top view of an array of lenslets that are added to the top surface of the secondary optic shown in FIG. 5 also in order to obtain a broader angular distribution of light;

FIG. 10 is a broken out sectional view of the array of lenslets shown in FIG. 9;

FIGS. 11-12 show broader light intensity versus polar angle distributions of light that are obtained by adding light diffusing features such as shown in FIGS. 7-10;

FIG. 13 is a graph including plots of transmittance verses deflection angle for prior art illumination lenses and lenses according to embodiments of the present invention;

FIG. 14 is an illumination lens that includes a saw tooth TIR section in addition to a central lens portion;

FIG. 15 is a graph including an X-Z coordinate system and generatrices (profiles) of two surfaces a lens according to an embodiment of the invention;

DETAILED DESCRIPTION

FIG. 15 is a plot of half-profiles (generatrices) of a first surface 1502 and a second surface 1504 of a lens 1506 according to an embodiment of the invention. The plots are shown in a coordinate system that includes an X-axis and a Z-axis. The surfaces 1502, 1504 are surfaces of revolution about the Z-axis (optical axis). The surfaces 1502, 1504 are joined by an annular edge surface 1508. The surfaces 1502, 1504 bound a body of transparent material, e.g., glass, plastic, silicone. The origin of the coordinate system corresponds to the location of the light source (e.g., an LED). By loose analogy to imaging optics, the origin of the X-Z coordinate system can be considered the one and only focus of the lens 1506. A single ray 1510 is shown emitted from the origin and refracted by the lens surfaces 1502, 1504. Various angles phi1, phi2, phi3 as will be described below are shown.

Figure 1:
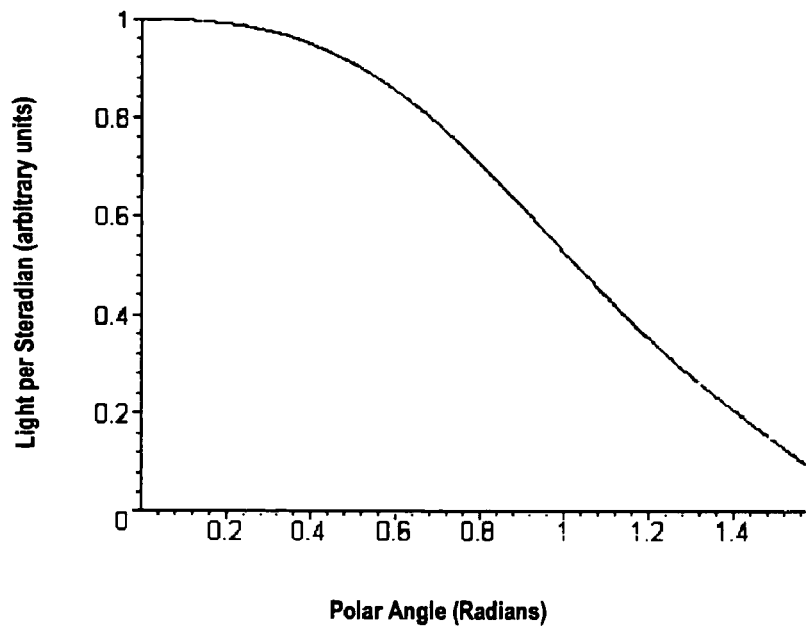
FIG. 1 is a graph of light intensity emission versus polar (zenith) angle for an LED.
Figure 2:
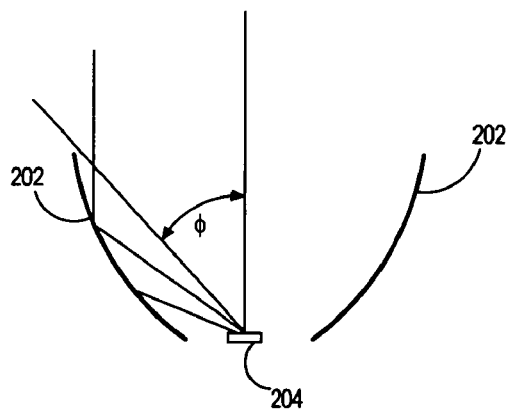
FIG. 2 is a schematic view of a reflector arranged to collect and reflect some light emitted by an LED.
Figure 3:
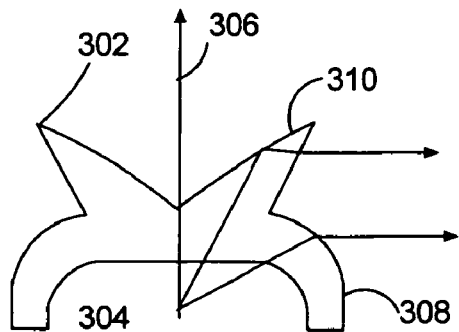
FIG. 3 is a primary optic for an LED.
Figure 4:
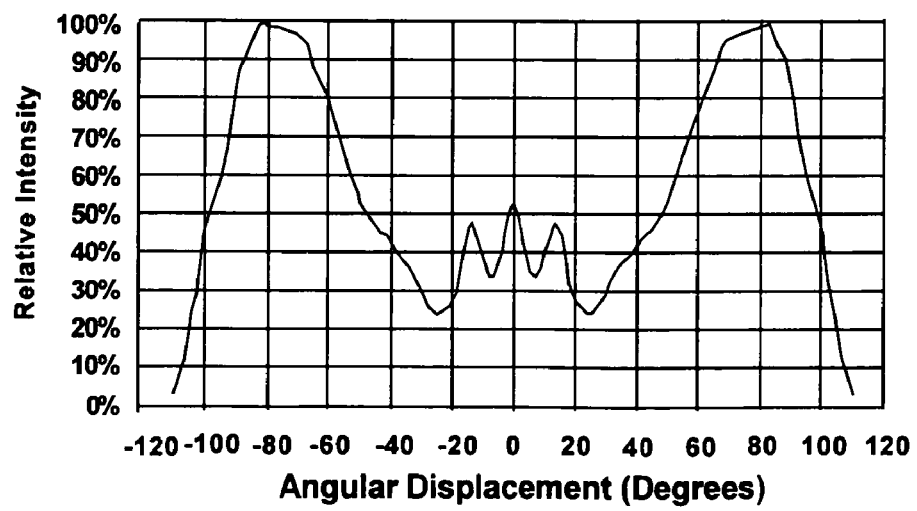
FIG. 4 is a plot of light intensity versus polar angle produced by the primary optic shown in FIG. 3.

According to embodiments of the invention illumination lenses have a first surface 1502 and a second surface 1504 such as shown in FIG. 1 shaped according to the following coupled differential equations:

$$\frac{\partial}{\partial \phi 1} r1(\phi 1) = \frac{r1 n2 \sin\left(\frac{1}{2}\phi 1 - \frac{1}{2}\phi 3\right)}{n2 \cos\left(\frac{1}{2}\phi 1 - \frac{1}{2}\phi 3\right) - n1} \quad \text{DE1}$$

$$\frac{\partial}{\partial \phi 1} r2 = \quad \text{DE2}$$

$$r2(\phi 1)\tan\left(\%3 - \arcsin\left(\frac{r1(\phi 1)\sin(\%4)}{r2(\phi 1)}\right)\right)\left(1 - \left(\frac{n1\cos(\%1)\%5}{(n2\cos(\%1) - n1)\sqrt{\%2}} + \frac{n1\sin(\%1)^2 n2\%5}{(n2\cos(\%1) - n1)^2\sqrt{\%2}} - \frac{1}{2}\frac{n1\sin(\%1)\left(2\frac{n2^2\sin(\%1)\cos(\%1)\%5}{(n2\cos(\%1) - n1)^2} + 2\frac{n2^3\sin(\%1)^3\%5}{(n2\cos(\%1) - n1)^3}\right)}{\left(\frac{3}{2}\right)}\right)\bigg/$$

$$(n2\cos(\%1) - n1)\%2\sqrt{1 - \frac{n1^2\sin(\%1)^2}{(n2\cos(\%1) - n1)^2\%2}} + $$

$$\frac{\frac{n2\cos(\%1)\%5}{n2\cos(\%1) - n1} + \frac{n2^2\sin(\%1)^2\%5}{(n2\cos(\%1) - n1)^2}}{\%2} - \left(\left(\frac{\partial}{\partial \phi 1} r1(\phi 1)\right)\sin(\%4)\right)\bigg/ r2(\phi 1) +$$

$$r1(\phi 1)\cos(\%4)\left(-\left(\frac{n1\cos(\%1)\%5}{(n2\cos(\%1) - n1)\sqrt{\%2}} + \frac{n1\sin(\%1)^2 n2\%5}{(n2\cos(\%1) - n1)^2\sqrt{\%2}} - \frac{1}{2}\frac{n1\sin(\%1)\left(2\frac{n2^2\sin(\%1)\cos(\%1)\%5}{(n2\cos(\%1) - n1)^2} + 2\frac{n2^3\sin(\%1)^3\%5}{(n2\cos(\%1) - n1)^3}\right)}{\left(\frac{3}{2}\right)}\right)\bigg/$$

$$(n2\cos(\%1) - n1)\%2\sqrt{1 - \frac{n1^2\sin(\%1)^2}{(n2\cos(\%1) - n1)^2\%2}} + $$

$$\frac{\frac{n2\cos(\%1)\%5}{n2\cos(\%1) - n1} + \frac{n2^2\sin(\%1)^2\%5}{(n2\cos(\%1) - n1)^2}}{(\%2)}\right)\bigg/ r2(\phi 1)\bigg/ \sqrt{1 - \frac{r1(\phi 1)^2\sin(\%4)^2}{r2(\phi 1)^2}}\bigg/$$

$$\left(1 - \frac{\tan\left(\%3 - \arcsin\left(\frac{r1(\phi 1)\sin(\%4)}{r2(\phi 1)}\right)\right)r1(\phi 1)\sin(\%4)}{r2(\phi 1)\sqrt{1 - \frac{r1(\phi 1)^2\sin(\%4)^2}{r2(\phi 1)^2}}}\right)$$

-continued $$\%1 := -\frac{1}{2}\phi1 + \frac{1}{2}\phi3(\phi1)$$

$$\%2 := 1 + \frac{n2^2\sin(\%1)^2}{(n2\cos(\%1) - n1)^2}$$

$$\%3 := \arcsin\left(\frac{n1\sin(\%1)}{(n2\cos(\%1) - n1)\sqrt{\%2}}\right)$$

$$\%4 := -\%3 + \arctan\left(\frac{n2\sin(\%1)}{n2\cos(\%1) - n1}\right)$$

$$\%5 := -\frac{1}{2} + \frac{1}{2}\left(\frac{\partial}{\partial\phi1}\phi3(\phi1)\right)$$

Where:

n2 is the index of refraction of the lens 1506 defined by the equations;
n1 is the index of refraction of the surrounding medium (e.g., of air) which usually equals 1;
phi1 is the polar angular coordinate (zenith angle) of the first lens surface;
phi3 is the polar angle (zenith angle) of an ideal ray (a ray emitted at the origin) that was initially emitted at angle phi1 after the ray has left the second surface 1504 of each lens defined by the equations (see FIG. 15) and is given by:

$$\frac{\int_{\phi1\_MIN}^{\phi1}\text{rad\_in}(\phi1)\cdot 2\pi\cdot\sin(\phi1)d\phi1}{\int_{\phi1\_MIN}^{\phi1\_MAX}\text{rad\_in}(\phi1)\cdot 2\pi\cdot\sin(\phi1)d\phi1} = \frac{\int_{\phi3\_MIN}^{\phi3}\text{rad\_out}(\phi3)\cdot 2\pi\cdot\sin(\phi3)d\phi3}{\int_{\phi3\_MIN}^{\phi3\_MAX}\text{rad\_out}(\phi3)\cdot 2\pi\cdot\sin(\phi3)d\phi3} \quad \text{EQU. 1}$$

where,
phi1_MIN and phi1_MAX are the lower and upper limits polar angle limits respectively of light collected by each lens 1506 defined by the equations;
phi3_MIN and phi3_MAX are the lower and upper limits respectively of a predetermined specified output light intensity distribution for each lens 1506 defined by the equations;
rad_in(phi1) is the light intensity distribution of the light source (e.g., LED) for which the lens 1506 is designed; and
rad_out(phi3) is the predetermined specified output light intensity distribution for each lens defined by the equations;
phi2 is a polar angular coordinate of the second lens surface and is given by:

$$\phi2 = \phi1 + \arcsin\left(\frac{n1\sin(\%1)}{(-n2\cos(\%1)+n1)\sqrt{\frac{n2^2\sin(\%1)^2}{(-n2\cos(\%1)+n1)^2}+1}}\right) - \arctan\left(\frac{n2\sin(\%1)}{-n2\cos(\%1)+n1}\right) - \quad \text{EQU. 2}$$

$$\arcsin\left(r1(\phi1)\sin\left(\arcsin\left(\frac{n1\sin(\%1)}{(-n2\cos(\%1)+n1)\sqrt{\frac{n2^2\sin(\%1)^2}{(-n2\cos(\%1)+n1)^2}+1}}\right) - \arctan\left(\frac{n2\sin(\%1)}{-n2\cos(\%1)+n1}\right)\right)\Big/r2(\phi1)\right)$$

$$\%1 := -\frac{1}{2}\phi1 + \frac{1}{2}\phi3(\phi1)$$

and $$\frac{\partial\phi3}{\partial\phi1} = \left(\frac{\text{rad\_in}(\phi1)\cdot 2\pi\cdot\sin(\phi1)}{\text{rad\_out}(\phi3)\cdot 2\pi\cdot\sin(\phi3)}\right)\cdot\left(\frac{\int_{\phi3\_MIN}^{\phi3\_MAX}\text{rad\_out}(\phi3)\cdot 2\pi\cdot\sin(\phi3)d\phi3}{\int_{\phi1\_MIN}^{\phi1\_MAX}\text{rad\_in}(\phi1)\cdot 2\pi\cdot\sin(\phi1)d\phi1}\right) \quad \text{EQU. 3}$$

with initial conditions r1_ini and r2_ini for r1(phi1) and r2(phi1) respectively EQU. 1 is solved numerically to obtain a value of phi3 for each input value of phi1 and DE1 and DE2 are integrated numerically, e.g., using the Runge Kutta integrator.

If phi1_min=phi3_min=0, EQU. 3 will be undefined at phi1_min=0. In this case, instead of using EQU. 3.0 one can use the values of phi3 obtained from EQU. 1 at two closely spaced points (e.g., spaced by 0.001) to obtain a finite difference approximation to dphi3/dphi1.

Figure 16:
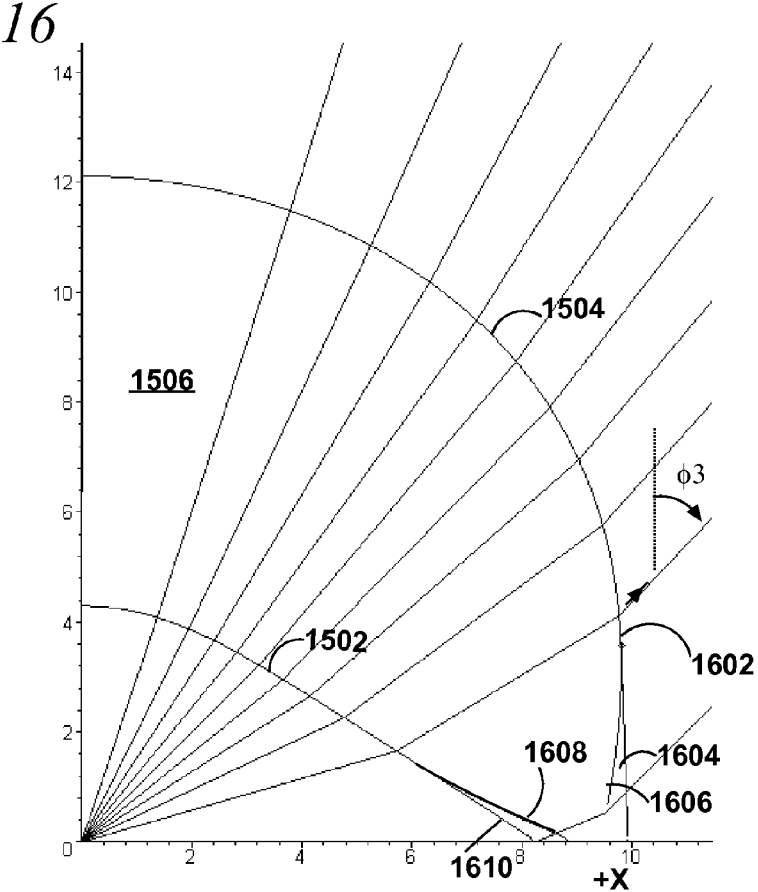
FIG. 16 is a graph including the X-Z coordinate system and profiles of a refined version of the lens shown in FIG. 15 that has a modified positive draft portion of its outer surface to facilitate injection molding and a modified corresponding portion of the inner surface to compensate for the modified positive draft portion and maintain light distribution control.

The most economical way to make the lens 1506 (and other embodiments described by the equations given above and below) is by molding e.g. injection molding or glass molding. To simplify the construction of the molds used to mold the lens 1506, the first lens surface 1502 can be molded by the core of the mold and the second lens surface 1504 by the cavity of the mold. (This may not be possible for all versions of the lens 1506.) Best practice in injection molding is to have a draft angle of one-half to a few degrees. The design of the part to be molded and the mold cannot be such that the solidified molding material will be locked into the mold. Referring to FIG. 15 it is seen that at location 1512 the second surface 1504 of the lens is vertical (parallel to the Z-axis). Versions of the lens 1506 in which this condition occurs could be injection molded with a mold that has a parting line at location 1512, but this would not be best, as the gate residual would have to be cut from the lens surface. A solution to this problem is as follows. The lens equations given above are integrated to an intermediate value of phi1 (corresponding to a value of phi2) at which the second surface 1504 has a slope corresponding to a desired draft angle and then second surface 1504 of the lens is extended downward at that draft angle. In FIG. 16 the intermediate point which in this example corresponds to a draft angle of two degrees is labeled with reference numeral 1602. The extension of the second surface at the draft angle is labeled 1604. The portion extended at the draft angle 1604 is frusto-conical. The portion of the profile of the second surface 1504 that is replaced by the extension 1604, is labeled 1606. The second surface need only be extended down far enough to intersect a ray emitted at phi1_MAX, after that ray has been refracted by the first surface 1502, but can be extended further. For example, integrally molded mounting features such as mounting flanges and standoff pins can be located below the surfaces defined by the generatrices shown in the FIGs. Because the extension at the draft angle 1604 differs from the replaced section 1606, light rays would not, if nothing else were done, be directed out of the lens at the correct angles. To resolve this, and correct the deflection of rays back to what would be obtained in the original lens 1506, a portion of the first lens surface 1502 that refracts light to the draft angle extension 1604 is redefined by the following equation.

$$\frac{\partial}{\partial \phi 1} r1(\phi 1) = -\frac{r1 n2 \cos\left(\phi 1 - phiD + \arcsin\left(\frac{n1\cos(-\phi 3 + phiD)}{n2}\right)\right)}{n2\sin\left(\phi 1 - phiD + \arcsin\left(\frac{n1\cos(-\phi 3 + phiD)}{n2}\right)\right) - n1}$$ DE3 where, r1, n1, n2 phi1, phi3 are as defined above; and phiD is a specified draft angle.

(Note that in order to maintain consistency with the definitions of phi1, phi2 and phi3 (see FIG. 15), positive values of phiD are measured clockwise from the Z-axis, thus what is referred to as a positive draft angle in the injection molding art, will be entered as a negative value in DE3)

The redefined portion of the first lens surface 1502, defined by DE3 is labeled 1608 in FIG. 16. The portion it replaces is labeled 1610. If the first surface 1502 were not modified by using DE3 to defined the portion 1608 light would be refracted by the draft angle extension 2104 to polar angles beyond phi3_max. (Note that some amount of light may be directed beyond phi3_max due to lack of perfect clarity of the lens, and the finite light source size, the latter factor being subject to mitigation by increasing the size of the lens 1506 relative to the source).

Using the draft angle extension 1604 of the second surface 1504 and the redefined portion 1608 of the first surface 1502 slightly reduces the transmittance of the lens but the amount of decrease is insignificant because of the small percentage of light effected by the redefined surfaces 1604, 1608, and because the changes in the angle of incidences due to the redefinition is small.

Note that DE1, DE2 and DE3 are defined in the domain of phi1. In order to find the value of phi1 at which to start the draft extension 1604 and switch to using DE3, the following equation is used:

$$phiD = \phi 2 - \frac{\pi}{2} - theta\_i2$$ EQU. 4 where, phi2 is given above by EQU. 2; and theta_i2 is given by:

$$theta\_i2 = \arcsin\left(\frac{n1\sin(\%1)}{(n2\cos(\%1) - n1)\sqrt{\frac{n2^2\sin(\%1)^2}{(n2\cos(\%1) - n1)^2} + 1}}\right) -$$

$$\arcsin\left(r1(\phi 1)\sin\left(-\arcsin\left(\frac{n1\sin(\%1)}{(n2\cos(\%1) - n1)\sqrt{\frac{n2^2\sin(\%1)^2}{(n2\cos(\%1) - n1)^2} + 1}}\right) + \arctan\left(\frac{n2\sin(\%1)}{n2\cos(\%1) - n1}\right)\right)/(r2(\phi 1))\right)$$ EQU. 5

$$\%1 := -\frac{1}{2}\phi 1 + \frac{1}{2}\phi 3(\phi 1)$$

and where, n1, n2, phi1, phi3, r1 and r2 are as defined above.

To use EQU. 4 (with sub-expressions defined by EQU. 2 and EQU. 5) a selected draft angle (e.g., ½ to a few degrees) is entered for PhiD and the EQU. 4 is solved numerically for phi1 using a root finding method. Note that each evaluation of EQU. 4 will involve integrating DE1 and DE2 up to a value phi1 in order to determine r1, r2. Once a value of phi1 corresponding to phiD is found, a corresponding value of r1 for the initial condition for DE3 can be found by integrating DE1 up to this value of phi1. The value of phi1 found in this way is referred to herein below as phi1 at phiD.

For each of several examples discussed herein a table of inputs to the lens equations is given. The table for the lens represented in FIG. 16 is:

TABLE I

| | |
|---|---|
| Phi1_MIN | 0.0 radians |
| Phi1_MAX | 1.57 radians (90 degrees) |
| Phi3_MIN | 0.0 radians |
| Phi3_MAX | 0.873 radians (45 degrees) |
| PhiD | 0.035 radians (−2.0 degrees) |
| Phi1 at phiD | 1.33 radians (76.2 degrees) |
| rad_in(phi1) | FIG. 1 |
| rad_out(phi3) | cos(phi3)^(−3.5) (highly uniform on plane) |
| r1_ini | 4.3 |
| r2_ini | 12.118 |
| n1 | 1.0 |
| n2 | 1.497 (PMMA) |
| Phi_start | Phi1_min |
| Calculated Transmission | 91.7% |

Note that although the initial conditions and dimensions shown in the FIGs. can be considered to be in arbitrary units (meaning that scaling is possible), the values were selected with millimeter units in mind. In fact, a prototype discussed below was made with these dimension in millimeters. The second to last row in the tables determines the Phi1 value at which the initial conditions r1_ini and r2_ini are defined. The choice of r1_ini and r2_ini is not critical. The difference between r1_ini and r2_ini should be chosen to give a designed initial lens thickness. Alternatively, r2_can be adjusted to give a certain lens diameter. One caveat is that if r1_ini and r2_ini are chosen too close the profiles given by the lens equations may cross-over which is physically excluded. The solution to this problem is to choose r1_ini and r2_ini further apart and reintegrate the lens equations. Also, a smaller difference between r1_ini and r2_ini will lead to a faster mold cooling time and therefore increased manufacturing productivity. Furthermore r1_ini must be large enough to accommodate the LED.

The lens shown in FIG. 16 collects light energy from a full hemisphere of solid angle from an LED and distributes the light substantially uniformly on an area of a plane (e.g., floor, ceiling or wall). Additionally, the light is substantially confined to a cone of polar angle (zenith angle) 45 degrees. This is a good polar angle limit for flood lighting. Some luminaires used for general lighting emit light in even broader angular ranges. The lens can readily be adapted to emit over larger angular ranges by adjusting phi3_max. Of course, uniform illumination of an area of a plane cannot be obtained without limits on phi3_max because as phi3_max approaches Pi/2 the light energy requirement for any finite illumination level goes to infinity.

In FIG. 16 a series of design rays 1602 are shown emanating from the origin and traced through the lens 1506. (Only two are connected to lead lines so as not to crowd the drawings). One ray which is not visible is along the +Z axis. Another ray which is initially not visible is emitted along the +X axis and is then refracted at an angle by the lens. These are all ideal rays emanating from the origin of the X-Z coordinate system. The initial angles of these rays are not arbitrary, rather the angles are selected to divide the light energy emitted by the light source (e.g., LED) into equal energy portions. Doing so helps to visualize how the lens redistributes energy.

Figure 17:
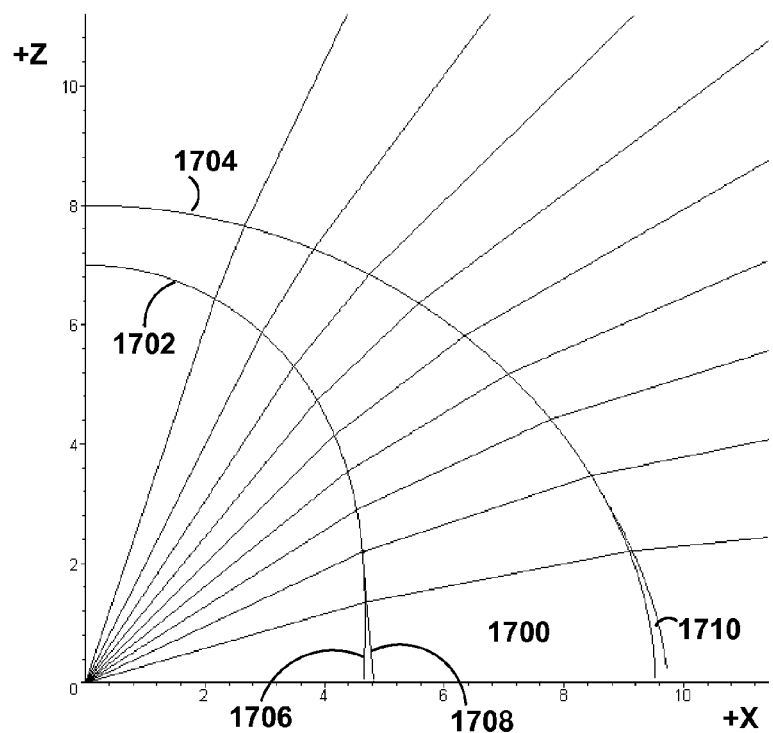
FIG. 17 is a graph including the X-Z coordinate system and profiles of a lens for producing a more uniform light distribution than the bare LED and that has a modified positive draft portion of its inner surface to facilitate injection molding and a modified corresponding portion of the outer surface to compensate for the modified positive draft portion and maintain light distribution control.

For certain combinations of the bare LED light distribution rad_in and the desired output light distribution rad_out, DE1 defines a profile of the first surface of the lens that has a negative draft near its edge (positive in the convention of the present description) leading to an "undercut" condition. Such a lens could not be molded using a straight forward mold design because the inner surface would lock onto the core of the mold as the lens material hardened. Such a lens might be made using a more expensive method e.g., using a core made of a low temperature meltable material that is melted out. An example where the first surface negative draft condition occurs is in the case that rad_in is nearly Lambertian as shown in FIG. 1 and rad_out is set equal to 1.0 in order to more uniformly distribute the light from an LED. FIG. 17 illustrates this example along with lens profile corrections that are discussed below. FIG. 17 shows a generatrix 1702 of a lens inner surface given by DE1 and a generatrix 1704 of the lenses outer surface given by DE2 in combination with DE1. A lower portion 1706 of the generatrix 1702 of the inner surface has a negative draft. In order to address this problem a portion of the inner lens surface 1702 starting from a point at which the surface reaches a suitable draft angle (e.g., ½ to 5 degrees) is replaced by a conical portion 1708 that continues at that draft angle. In order to compensate for the change of the inner surface, a portion 1710 of the outer surface is redefined according to the following lens equation:

$$\frac{\partial}{\partial \phi 1} r2\_d1 = r2\_d1(\phi 1)\tan\left(\arctan\left(\frac{n1\cos(\phi 3 - phiD + \%2)}{n1\sin(\phi 3 - phiD + \%2) - n2}\right) - \arcsin\left(\frac{r1\_switch\ \%4\%3}{\%1 r2\_d1(\phi 1)}\right)\right) \quad \text{DE4}$$

$$\left( \frac{n1\sin(\phi 1 - phiD)}{n2\sqrt{1 - \frac{n1^2\cos(\phi 1 - phiD)^2}{n2^2}}} - \left( -\frac{r1\_switch\ \%4\%3(-\tan(phiD)\sin(\phi 1) - \cos(\phi 1))}{\%1^2 r2\_d1(\phi 1)} - \right. \right.$$

$$\left. \frac{r1\_switch\ \%4\sin(\phi 1 - phiD + \%2)\left(1 - \frac{n1\sin(\phi 1 - phiD)}{n2\sqrt{1 - \frac{n1^2\cos(\phi 1 - phiD)^2}{n2^2}}}\right)}{\%1 r2\_d1(\phi 1)} \right) \Big/ \sqrt{1 - \frac{r1\_switch^2\ \%4^2\%3^2}{\%1^2 r2\_d1(\phi 1)^2}} \Bigg/$$

$$\left(1 - \tan\left(\arctan\left(\frac{n1\cos(\phi 3 - phiD + \%2)}{n1\sin(\phi 3 - phiD + \%2) - n2}\right) - \arcsin\left(\frac{r1\_switch\%4\%3}{\%1 r2\_d1(\phi 1)}\right)\right)r1\_switch\ \%4\%3 \Big/ \left(r2\_d1(\phi 1)\%1\sqrt{1 - \frac{r1\_switch^2\%4^2\%3^2}{\%1^2 r2\_d1(\phi 1)^2}}\right)\right)$$

$\%1 := \tan(phiD)\cos(\phi 1) - \sin(\phi 1)$ $\%2 := \arcsin\left(\frac{n1\cos(\phi 1 - phiD)}{n2}\right)$ $\%3 := \cos(\phi 1 - phiD + \%2)$ $\%4 := \tan(phiD)\cos(phi1\_phiD) - \sin(phi1\_phiD)$ where, n1, n2 phi1, phi3, phiD are as defined above;
r2_d1 is the polar radial coordinate of the redefined portion 1710 of the second lens surface 1704;
phi1_phiD is the value of phi1 at phiD on the first surface defined by DE1;
r1_switch is the polar radial coordinate of the point on the first surface 1702 at which the switch is made to the conical portion 1708, i.e., r1(phi1_phiD)=r1_switch.
Although DE4 is defined in the domain of phi1, the polar angular coordinate phi2 of the redefined portion 1710 is given by:

$$\text{phi2\_d1} = \frac{1}{2}\pi + phiD - \arcsin\left(\frac{n1\cos(\phi1 - phiD)}{n2}\right) - $$
$$\arcsin\Big(r1\_switch(\tan(phiD)\cos(\text{phi1\_phiD}) - \sin(\text{phi1\_phiD}))$$
$$\cos\left(\phi1 - phiD + \arcsin\left(\frac{n1\cos(\phi1 - phiD)}{n2}\right)\right)\Big/$$
$$((\tan(phiD)\cos(\phi1) - \sin(\phi1))\text{r2\_d1}(\phi1))\Big)$$

EQU. 6

Cartesian coordinate of the redefined portion 1710 can be obtained from r2_d1 and phi2_d1.
In order to find the value of phi1 at which the inner lens surface has an angle equal to a desired draft the following equation is used:

$$phiD = \phi1 - \frac{\pi}{2} - \theta1 \qquad \text{EQU. 7}$$

where theta_1 is the angle of incidence of ideal rays on the first surface and is given by:

$$\theta1 := -\arctan\left(\frac{n2\sin\left(-\frac{1}{2}\phi1 + \frac{1}{2}\phi3(\phi1)\right)}{n2\cos\left(-\frac{1}{2}\phi1 + \frac{1}{2}\phi3(\phi1)\right) - n1}\right) \qquad \text{EQU. 8}$$

As in the case of EQU. 4, EQU. 7 (with theta_1 defined by EQU. 8) is used by plugging in a selected value for phiD (e.g., ½ to a few degrees) and using a root finding method to find the value of phi1 that balances EQU. 7. Table II below list information for the lens shown in FIG. 17.

TABLE II

| | |
|---|---|
| Phi1_MIN | 0.0 radians |
| Phi1_MAX | 1.57 radians (90 degrees) |
| Phi3_MIN | 0.0 radians |
| Phi3_MAX | 1.57 radians (90 degrees) |
| PhiD | 0.087 radians (−5.0 degrees) |
| Phi1_phiD | 1.13 radians (64.7 degrees) |
| rad_in(phi1) | FIG. 1 |
| rad_out(phi3) | 1.0 (uniform goal) |
| r1_ini | 7.0 |
| r2_ini | 9.0 |
| n1 | 1.0 |
| n2 | 1.497 (PMMA) |
| Phi_start | Phi1_min |
| Calculated Transmission | 92.19% |

FIG. 17 illustrates the ability to change the distribution of light within the angular bounds of light emitted by the source without changing the bounds themselves. Note that Phi1_MIN=Phi3_MIN=0.0 and Phi1_MAX=Phi3_MAX=1.57 (90 degrees). The version of the lens shown in FIG. 17 makes the light output more uniform than the bare LED.

Figure 18:
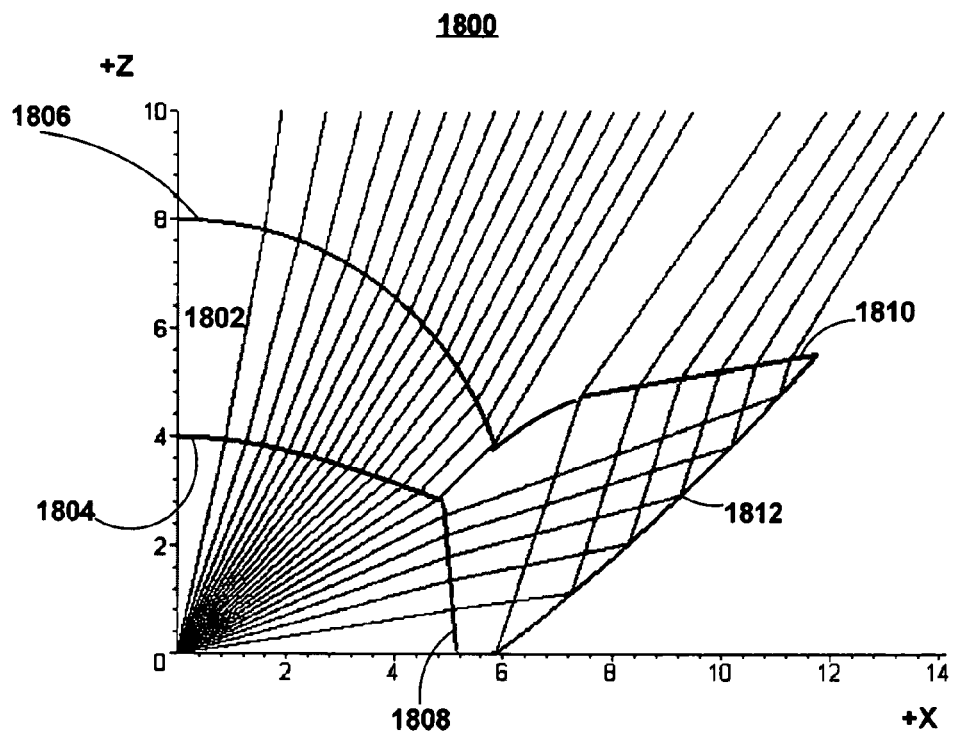
FIG. 18 is a graph including the X-Z coordinate system and profiles of a lens that has a central refracting portion and outer Total Internal Reflecting wings that together distribute light in a controlled manner within a relatively narrow range centered on the Z-axis.

As shown by plot 1304 in FIG. 13 as the deflection angle increases beyond a certain point the transmission of the lens drops off precipitously. For certain lighting tasks a narrow distribution of light is desirable. If a high collection efficiency is to be maintained by keeping phi1_max at 90 degrees then a higher deflection angle is needed in order to produce a narrower distribution of light. FIG. 18 shows generatrices of a lens 1800 that includes a central portion 1802 that has a first surface 1804 and a second surface 1806 defined by DE1 and DE2 and also has a conical surface 1808, an exit surface 1810 and a Total Internal Reflection (TIR) surface 1812 given by DE5 below. The TIR surface defined by DE5 works in concert with the central portion 1802 to continue the overall light intensity distribution specified by rad_out.

DE5

$$\frac{\partial}{\partial \phi1} r2\_w = -r2\_w(\phi1)\tan\left(\frac{1}{4}\pi - \frac{1}{2}\text{phi\_draft} + \frac{1}{2}\arcsin\left(\frac{n1\%2}{n2}\right) - \frac{1}{2}\arcsin\left(\frac{n1\sin(\text{phi\_exit}-\phi3)}{n2}\right) + \frac{1}{2}\text{phi\_exit} + \arcsin\left(\frac{r1\_switch\ \%4\cos(\%3)}{\%1 r2\_w(\phi1)}\right)\right)$$

$$\left(-\frac{n1\sin(-\phi1 + \text{phi\_draft})}{n2\sqrt{1 - \frac{n1^2\%2^2}{n2^2}}} - \left(\frac{(r1\_switch\ \%4\cos(\%3)(-\tan(\text{phi\_draft})\sin(\phi1) - \cos(\phi1)))}{(\%1^2 r2\_w(\phi1))} - \frac{r1\_switch\ \%4\sin(\%3)\left(1 + \frac{n1\sin(-\phi1 + \text{phi\_draft})}{n2\sqrt{1 - \frac{n1^2\%2^2}{n2^2}}}\right)}{\%1 r2\_w(\phi1)}\right)\right/$$

$$\left.\sqrt{1 - \frac{r1\_switch^2\%4^2\cos(\%3)^2}{\%1^2 r2\_w(\phi1)^2}}\right)\Big/$$

-continued $$\left(1 + \tan\left(\frac{1}{4}\pi - \frac{1}{2}\text{phi\_draft} + \frac{1}{2}\arcsin\left(\frac{n1\%2}{n2}\right) - \frac{1}{2}\arcsin\left(\frac{n1\sin(\text{phi\_exit} - \phi 3)}{n2}\right) + \frac{1}{2}\text{phi\_exit} + \arcsin\left(\frac{r1\_\text{switch }\%4\cos(\%3)}{\%1 r2\_w(\phi)}\right)\right)\right)$$

$$r1\_\text{switch }\%4\cos(\%3) \Big/ \left(r2\_w(\phi 1)\%1\sqrt{1 - \frac{r1\_\text{switch}^2 \ \%4^2\cos(\%3)^2}{\%1^2 r2\_w(\phi 1)^2}}\right)$$

$\%1 := \tan(\text{phi\_draft})\cos(\phi 1) - \sin(\phi 1)$ $\%2 := \cos(-\phi 1 + \text{phi\_draft})$ $\%3 := \phi 1 - \text{phi\_draft} + \arcsin\left(\frac{n1\%2}{n2}\right)$ $\%4 := \tan(\text{phi\_draft})\cos(\text{phi1\_switch}) - \sin(\text{phi1\_switch})$ Where, n1, n2, phi1, phi3 are as defined above;
r2_w is the polar radial coordinate of the TIR surface 1812;
r1_switch is the polar radial coordinate of the top of the conical surface 1808 (also in the case of FIG. 18 the point at which the conical surface 1808 meets the first surface 1804 defined by DE1.)
phi1_switch is the polar angular coordinate of the top of the conical surface 1808;
phi_draft is the angle of the conical surface 1808 measured in the clockwise direction from the positive Z-axis;
phi_exit is the angle of the surface normal of the exit surface measured in the clockwise direction from the positive Z-axis, with initial condition r2_w_ini.
The polar angular coordinate (zenith angle) of the TIR surface 1812 is given by the following equation.

$$\text{phi2}w = \frac{1}{2}\pi + \text{phi\_draft} - \arcsin\left(\frac{n1\cos(-\phi 1 + \text{phi\_draft})}{n2}\right) - \arcsin\left(r1\_\text{switch}(\tan(\text{phi\_draft})\cos(\text{phi1\_switch}) - \sin(\text{phi1\_switch}))\cos\left(\phi 1 - \text{phi\_draft} + \arcsin\left(\frac{n1\cos(-\phi 1 + \text{phi\_draft})}{n2}\right)\right)\Big/ ((\tan(\text{phi\_draft})\cos(\phi 1) - \sin(\phi 1))r2\_w(\phi 1))\right)$$ EQU. 9 r1_w and phi2w together define the TIR surface 1812 in polar coordinates. Cartesian coordinates can be obtained from them.

In embodiments such as shown in FIG. 18 phi_draft has a small negative value to allow the lens 1800 to release from a mold. A more negative phi_draft will tend to increase the size of the TIR surface 1812. On the other hand a more negative value of phi_exit tends to reduce the size of the TIR surface. Both phi_draft and phi_exit should be selected (using phi1_max, phi1_switch and phi3_max as points of reference) to avoid large angles of incidence that would reduce light transmission. Note that the exit surface 1810 can be raised slightly from the top edge of the TIR surface 1812 in order to provide a peripheral location for an injection molding gate. The portion of the lens 1800 between the conical surface 1808, the exit surface 1810 and the TIR surface 1812 is referred to herein as the "TIR wings". Table III below lists information for the lens shown in FIG. 18.

TABLE II

| Phi1_MIN | 0.0 radians |
| Phi1_MAX | 1.57 radians (90 degrees) |

TABLE II-continued

| Phi3_MIN | 0.0 radians |
| Phi3_MAX | 0.61 radians (35 degrees) |
| Phi_draft | 0.087 radians (−5.0 degrees) |
| Phi_exit | −0.174 radians (−10.0 degrees) |
| Phi1_switch | 1.047 radians (60.0 degrees) |
| rad_in(phi1) | FIG. 1 |
| rad_out(phi3) | cos(phi3)^(−3) (uniform on plane goal) |
| r1_ini | 4.0 |
| r2_ini | 8.0 |
| r2_w_ini | 13.0 |
| n1 | 1.0 |
| n2 | 1.497 (PMMA) |
| Phi_start | Phi1_min for DE1, DE2 Phi1_switch for DE5 |
| Calculated Transmission | 91.73% |

Figure 19:
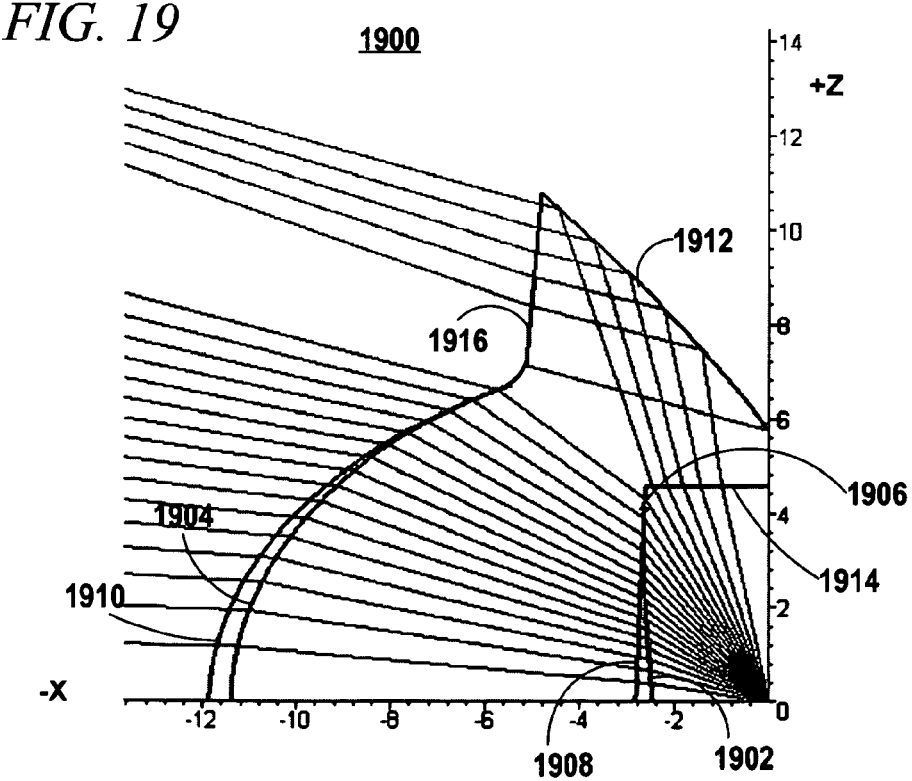
FIG. 19 is a graph including the X-Z coordinate system and profiles of a lens that has Total Internal Reflecting wings located at the top and a surrounding refracting portion that together distribute light in a controlled manner within a narrow angular range near the "equator" of a co-incident polar coordinate system.

Whereas the TIR wings shown in FIG. 18 are useful in confining light to smaller angular range around the Z axis, the TIR wings defined by DE5 can also be used to confine light to a small angular range near phi3=π/2 (near the "equator" of a the spherical coordinate system). FIG. 19 shows a lens 1900 that does this. In order to use the differential equations given above to define a lens having TIR wings at the top as shown in FIG. 19 the differential equations are integrated to the left of the Z-axis, i.e., with negative values of the phi variables. Note rad_out and rad_in are generally assumed to be symmetric so using negative phi values does not change these light distributions. FIG. 19 shows a generatrix of a first surface 1902 defined by DE1 and a corresponding generatrix of a second surface 1904 defined by DE2 in combination with DE1. The first surface 1902 has a negative draft meaning that it would lock onto the core of a mold and could not be removed. To resolve this, most of the first surface starting from point 1906 at which phiD=−177.5 degrees (a positive draft angle of 2.5 degrees) was replaced by a constant draft conical section 1908 and a corresponding portion of the second surface 1904 was replaced by a second surface 1910 defined by DE4. The TIR wings of lens 1900 include a TIR reflecting surface 1912 defined by DE5, a constant draft surface 1914 and an exit surface 1916. In this special case in which phi_draft=−90 degrees the constant draft surface 1914 is planar, as opposed to conical. Table IV below gives information about the lens shown in FIG. 19.

TABLE IV

| General Information | |
| --- | --- |
| Phi1_MIN | 0.0 radians |
| Phi1_MAX | −1.57 radians (−90 degrees) |
| Phi3_MIN | −1.22 radians (−70 degrees) |

TABLE IV-continued

| | |
|---|---|
| Phi3_MAX | −1.57 radians (−90 degrees) |
| n1 | 1.0 |
| n2 | 1.497 (PMMA) |
| rad_in(phi1) | FIG. 1 |
| rad_out(phi3) | 1.0 (uniform goal) |
| Phi_start | Phi1_max for DE1, DE2 |
| | Phi1_switch for DE5 |
| | phi1_phiD for DE4 |
| Calculated Transmittance | 91.023% |

Information Related to Refractive Lens Part defined by DE1, DE2

| | |
|---|---|
| r1_ini | 2.5 |
| r2_ini | 11.4 |

Information Related to Refractive Lens Part redefined by DE4

| | |
|---|---|
| PhiD | 3.097 radians (−177.5 degrees) |
| phi1_phiD | −.578 radians (−33.1 degrees) |
| R1_switch | 4.86 |
| R2_switch | 8.87 |

Information Related to TIR wings defined by DE5

| | |
|---|---|
| Phi1_switch | −.523 radians (−30.0 degrees) |
| Phi_draft | −1.57 radians (−90 degrees) |
| Phi_exit | −1.48 radians (−85 degrees) |
| r2_w_ini | 11.8 |

R2_switch is the initial condition for DE5 which in the case of the lens represented in FIG. 19 was integrated starting at phi1_phiD. R2_switch was the final value of r2 given by DE2 at phi1_phiD.

Lenses defined by the lens equations given above are able to collect a full hemisphere of light emitted by an LED, and are able to distribute the light in a controlled manner. At the same time surfaces of the lens defined by these equations are shaped to reduce transmittance losses. The examples described while providing a wide variety of light distributions hardly lose any more light by reflection than would an optical window at normal incidence. The calculated transmittances for the lens examples described herein are negligibly different from the transmittance for light passing perpendicularly through an optical window. As illustrated above, many practical general illumination lenses defined by the differential equations given above the calculated transmittance is over 90%. The second curve 1304 in FIG. 13 gives transmittance as a function of deflection angle for lenses defined by DE1 and DE2. The deflection angle is equal to (phi3-phi1). For normal incidence the transmittance through both surfaces, based on an index of 1.497, is 92.2%%. A transmittance of 90% represents a high optical luminaire efficiency compared to standard luminaires. Also, reflected light may eventually scatter out of the lens into the beam pattern. This effect may be increased making the area under the lens surrounding the LED reflective. The optical luminaire efficiency is defined as the percentage of light emitted by a light source (e.g., LED) that is output by an associated luminaire which in the present case includes the lenses defined by the above differential equations.

There is another efficiency factor that is termed herein "pattern efficiency" and is related to the percentage of light energy in an output distribution of light that is in excess of a required light intensity. Because the light distribution patterns produced by most luminaries (e.g., flood lamps, downlights) is stronger in a central part of an angular or spatial range that is intended to be illuminated, the total power of the luminaire must be higher than it would have to be if the pattern of illumination covered the angular or spatial range uniformly. Because the predetermined light output distribution rad_out (phi3) can be freely specified and achieved to a degree of fidelity illustrated below, lenses according to the above equations can produce light intensity distributions that avoid wastefully excessive central intensities. If a uniform light intensity distribution as a function of phi3 is needed then rad_out(phi3) is set equal to one in the above equations. If a flat area such as the floor of a room, desk or counter surface, is to be illuminated uniformly without wasteful excessive central intensity then rad_out(phi3) can be set to:

$$\text{rad\_out}(\phi 3) = \frac{1}{(\cos(\phi 3))^e} \qquad \text{EQU. 10}$$

where e is approximately equal to 3, e.g., 3.2, 3.5.

Figure 20:
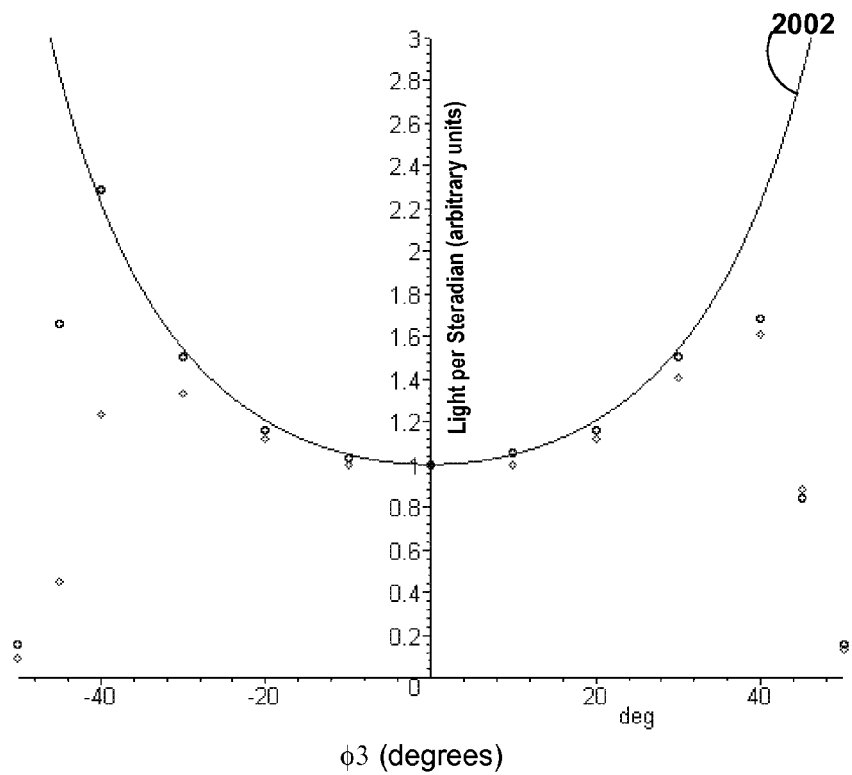
FIG. 20 is plot showing light distributions produced by the lens shown in FIG. 16 and a similar lens compared to an ideal target distribution for uniformly illuminating a flat area (e.g., floor, wall, ceiling)

This distribution with e=3.0 is a theoretically known distribution and is shown as a plot 2002 in FIG. 20 for a phi3 range from zero to 45. This distribution is quite the opposite of the usual luminaire distribution which is peaked in the center. This distribution is lowest in the center and increases as the polar angle phi3 increases. The increase is about a factor of 2.8 at 45 degrees. More light is required at high values of phi3, because there is more area per phi3 increment as phi3 increases. Examples of lenses defined using the intensity distribution specified by EQU. 10 are shown in FIG. 15, FIG. 16, FIG. 18, FIG. 21, FIG. 23, FIG. 24 and FIG. 25. According to embodiments of the invention a higher fidelity to the distribution shown in FIG. 16 which is based on e=3 is achieved if e is slightly higher than 3 e.g. 3.2, 3.5. This is believed to be due to the fact that the finite size of the LED die causes a blurring effect (akin to an angular analog of a point spread effect, or apodizing effect) which leads to lesser variation than intended. This is compensated by increasing e in rad_out of the form given by EQU. 10. The amount that e should be increased can be determined by making a few prototype lenses using different values of e. For example one can start with a value of e=3 which will probably produce an actual rad_out distribution that is too weak a function, then one can try 3.5 and depending on whether the variation of the resulting distribution function is too strong or too weak one can then use a lower or higher value of e. The inventor has found that a few prototypes are sufficient to achieve acceptable fidelity to the intended distribution.

In FIG. 20 the data points denoted by diamonds are based on measurements of the actual rad_out light distribution produced by a prototype lens where rad_out in the equations was as given by EQU. 10 with e=3.0—the theoretical value. The data points denoted by circles are based on measurements of the actual rad_out light distribution of a second prototype lens based on a value of e=3.5. Generatrices of the second prototype are shown in FIG. 16 and information relating thereto is given in Table I above. As shown the data points for the second prototype points follow the target function more closely. The measurements were done using a white Luxeon III LED manufactured by Lumileds of San Jose Calif. There was an observed asymmetry in the placement of the LED die of the Luxeon III used for testing which may have led to the asymmetry of the measured rad_out distributions shown in FIG. 20 and FIG. 22. Numerous IES files of prior art luminaries were reviewed and none were found that matched EQU. 10 with e=3.0 to the degree achieved with the second prototype. FIG. 20 does not convey the striking visual impact that the inventor observed when these lenses were first tested. Arranging a single LED with one of the lenses on a table to illuminate the ceiling one sees a large clear uniform disk of light about 10 ft (3.05 meters) in diameter. It is strikingly unfamiliar even to a person familiar with a variety of modern light fixtures.

A more general way of correcting rad_out based on discrepancies between the intended rad_out function and the measured rad_out function is to first make a lens with rad_out set equal to the target distribution and measure the actual rad_out distribution achieved at a number of points, e.g., 10 points. Then, the data points are normalized so that the integrated light intensity represented by the data points is equal to the integrated light intensity of the same 10 points of the target distribution. Next point-by-point differences are computed between the normalized measurements and the target rad_out function. These differences are then added to the points of the target rad_out function to obtain a corrected set of points of rad_out. A spline fit of the corrected set of points is then used as rad_out and the differential equations reintegrated and a new lens made based on the new integration. (Alternatively rather that a spline fit an interpolating routine is used) This procedure can be done recursively. If one is inclined to rely on ray tracing then ray tracing can be used to evaluate each new lens rather than making actual prototypes, however the inventor has relied on prototyping.

If it is desired to avoid a sharp shadow at the edge of the illuminated area rad_out(phi3 given by EQU. 10 can be multiplied by a function that is constant over a substantial portion of the phi3 range, say up to 0.8 times phi3_max, and then tapers down gradually (e.g., linearly). In some cases edge effects that occur at phi3_max even without altering rad_out (phi3) may provide sufficient tapering of the light pattern edge.

In practice there may be as much to be gained in terms of pattern efficiency by using lenses according to the present invention as there is to be gained in terms of optical luminaire efficiency (i.e., the percentage of light generated in the luminaire that escapes the luminaire).

Additionally the lenses defined by the lens equations given above have smooth surfaces with a limited number of corners which means that the issue of light loss at numerous corners is avoided. Additionally having smooth surfaces with a limited number of corners, means that the molds to make the lenses and consequently the lenses themselves can be made more economically.

Figure 21:
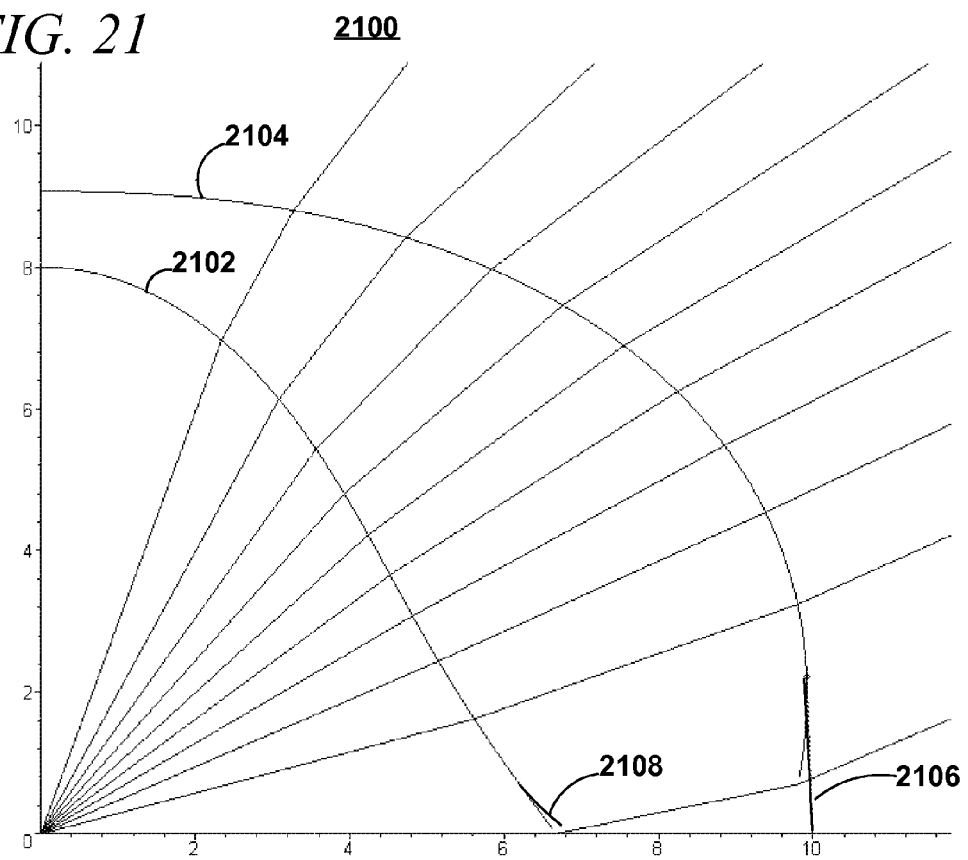
FIG. 21 is graph including the X-Z coordinate system and profiles of a lens similar to that shown in FIG. 15 but for producing a light distribution with a ~65 degree half angle width.

FIG. 21 shows generatrices of a lens 2100 defined by DE1, DE2, DE3 and designed to produce an output light distribution rad_out according to equation 14 with e=3.0. A portion of the outer surface 2104 was replaced by a constant draft 2106 section and a corresponding part 2108 of the inner surface 2102 was redefined by DE3. An adjustment of e to 3.2 in the equations defining the lens produced better fidelity to the intended light distribution pattern. Information for the lens shown in FIG. 21 is given in Table V.

TABLE V

| | |
|---|---|
| Phi1_MIN | 0.0 radians |
| Phi1_MAX | 1.57 radians (90 degrees) |
| Phi3_MIN | 0.0 radians |
| Phi3_MAX | 1.13 radians (65 degrees) |
| PhiD | −0.035 radians (−2.0 degrees) |
| Phi1_at_phiD | 1.41 radians (80.8 degrees) |
| rad_in(phi1) | FIG. 1 |
| rad_out(phi3) | $\cos(phi3)^{\wedge}(-3.2)$ |
| | (highly uniform on plane) |
| r1_ini | 8.0 |
| r2_ini | 9.07 |
| n1 | 1.0 |
| n2 | 1.497 (PMMA) |
| Phi_start | Phi1_min |
| Calculated Transmission | 92.15% |

Note that r2_ini was selected using a $1^{st}$ order ODE shooting method to obtain a lens diameter of 20.0 mm. In particular, after each integration r2_ini was scaled by 10.0 divided by ½ the lens diameter, this being continued for a few iterations until the lens diameter was within an acceptable tolerance of 20.0 mm.

Figure 22:
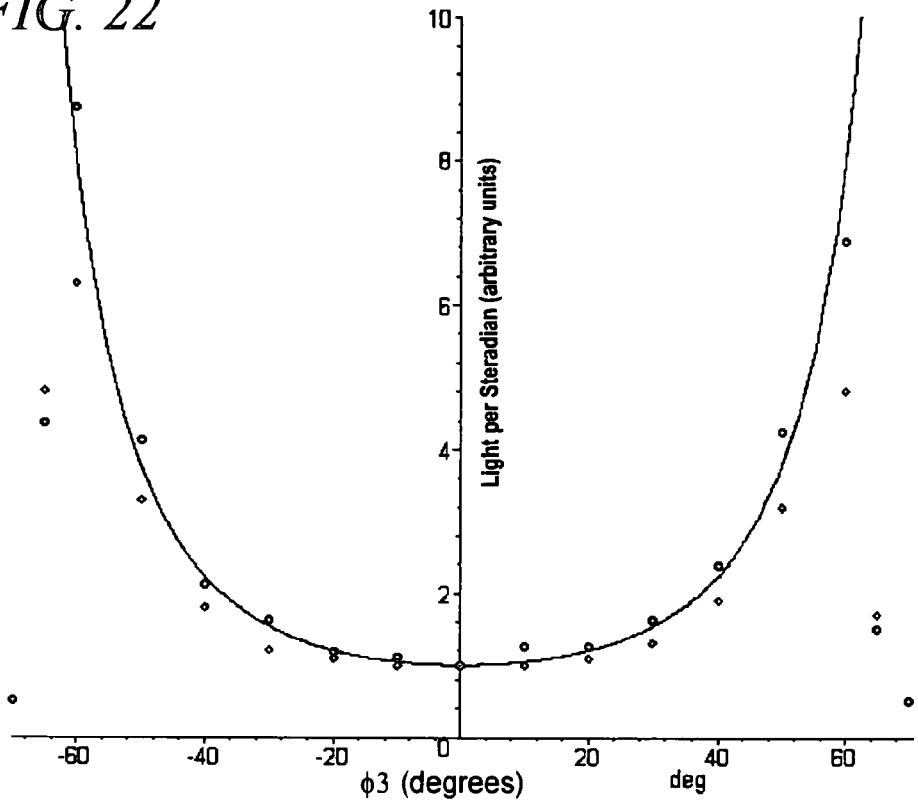
FIG. 22 is a plot showing light distributions produced by the lens shown in FIG. 21 and a similar lens compared to an ideal target distribution for uniformly illuminating a flat area (e.g., floor, wall, ceiling)

FIG. 22 shows data obtained with prototype lenses and the above mentioned Luxeon III LED. Diamond symbol data points are for a lens based on the e of EQU. 10 set to 3.0 (the theoretical value) and circle data points are for the lens 2100 for which e was set to 3.2. Note that high fidelity to the intended light distribution was achieved. Such a wide light distribution can for example be used for low bay lighting, or for indirect uplighting from a chandelier or torchiere. A "half lens" based on revolving the generatrix around only 180 degree could be used for sconce that mounted at 6' (1.83 meters) produces more than the usual accent lighting by illuminating a large e.g. 4' (1.22 meters) semicircle on an 8' (2.4 meter) ceiling above the sconce. A small mirror could be placed behind the lens to confine the light emitted by the LED to the azimuthal range from 0 to 180 degrees.

Figure 23:
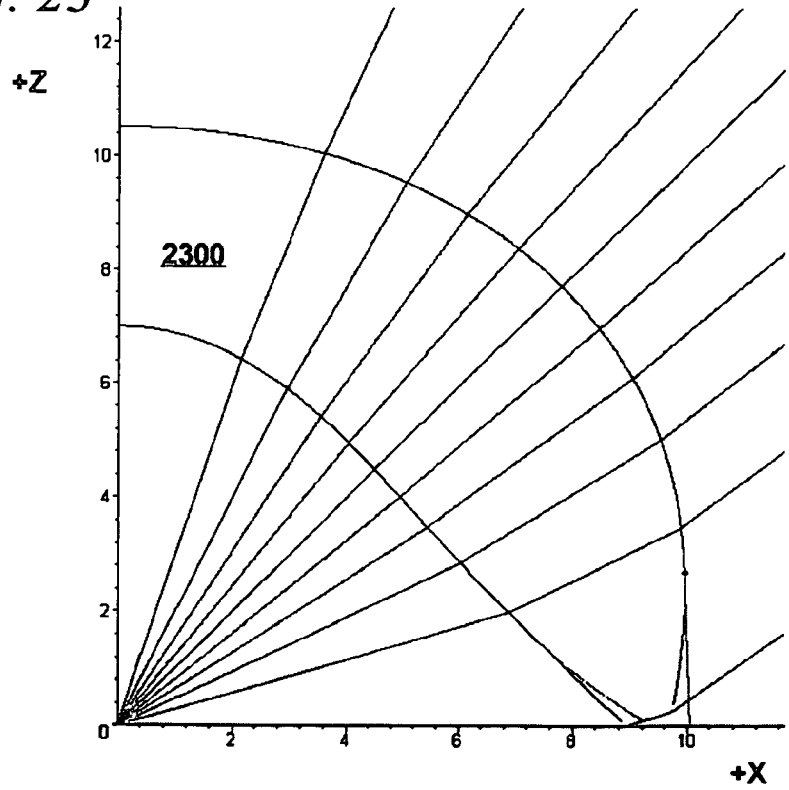
FIG. 23 is graph including the X-Z coordinate system and profiles of a lens similar to that shown in FIG. 15 but for producing a light distribution with a ~55 degree half angle width.

FIG. 23 shows a lens 2300 that is similar to those shown in FIG. 15 and FIG. 22 but for which phi3_max is 55 and with rad_out defined by EQU. 10 having an exponent e=3.3. Table IV below gives information related to lens 2300.

TABLE VI

| | |
|---|---|
| Phi1_MIN | 0.0 radians |
| Phi1_MAX | 1.57 radians (90 degrees) |
| Phi3_MIN | 0.0 radians |
| Phi3_MAX | 0.960 radians (55 degrees) |
| PhiD | 0.035 radians(−2.0 degrees) |
| Phi1_at_phiD | 1.36 radians (78.2 degrees) |
| rad_in(phi1) | FIG. 1 |
| rad_out(phi3) | $\cos(phi3)^{\wedge}(-3.3)$ |
| r1_ini | 7.0 |
| r2_ini | 10.5 |
| n1 | 1.0 |
| n2 | 1.497 (PMMA) |
| Phi_start | Phi1_min |
| Calculated Transmission | 91.09% |

Figure 24:
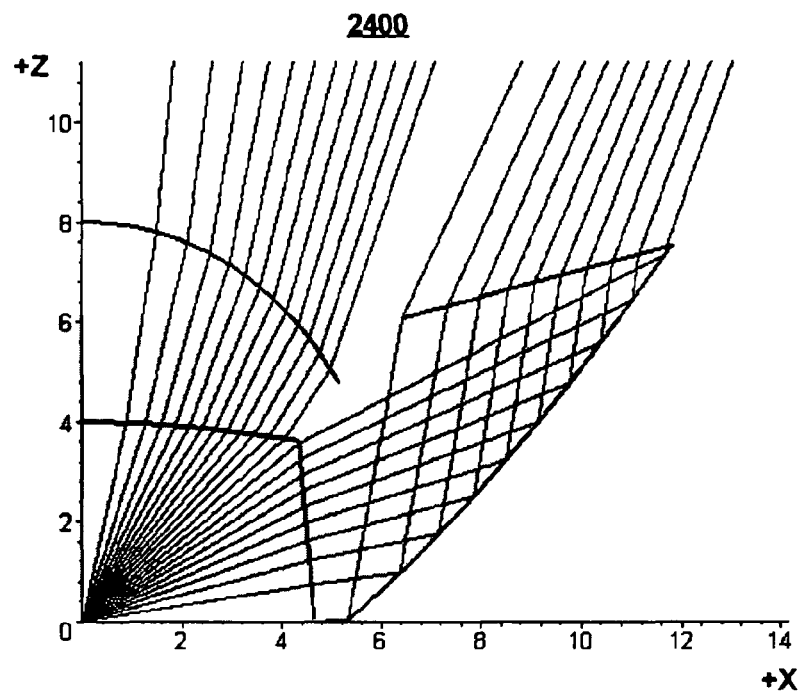
FIG. 24 is graph including the X-Z coordinate system and profiles of a lens similar to that shown in FIG. 18 but for producing a light distribution with a ~25 degree half angle width.

FIG. 24 shows a lens 2400 that is similar to that shown in FIG. 18 but for which phi3_max is 25 degrees as opposed to 35. Table VII below gives information related to lens 2400.

TABLE VII

| | |
|---|---|
| Phi1_MIN | 0.0 radians |
| Phi1_MAX | 1.57 radians (90 degrees) |
| Phi3_MIN | 0.0 radians |
| Phi3_MAX | 0.436 radians (25 degrees) |
| Phi_draft | 0.087 radians (−5.0 degrees) |
| Phi_exit | −0.262 radians (−15.0 degrees) |
| Phi1_switch | 0.872 radians (50.0 degrees) |
| rad_in(phi1) | FIG. 1 |
| rad_out(phi3) | $\cos(phi3)^{\wedge}(-3)$ |
| | (uniform on plane goal) |
| r1_ini | 4.0 |
| r2_ini | 8.0 |
| r2_w_ini | 14.0 |
| n1 | 1.0 |
| n2 | 1.497 (PMMA) |
| Phi_start | Phi1_min for DE1, DE2 |
| | Phi1_switch for DE5 |
| Calculated Transmission | 91.79% |

Figure 25:
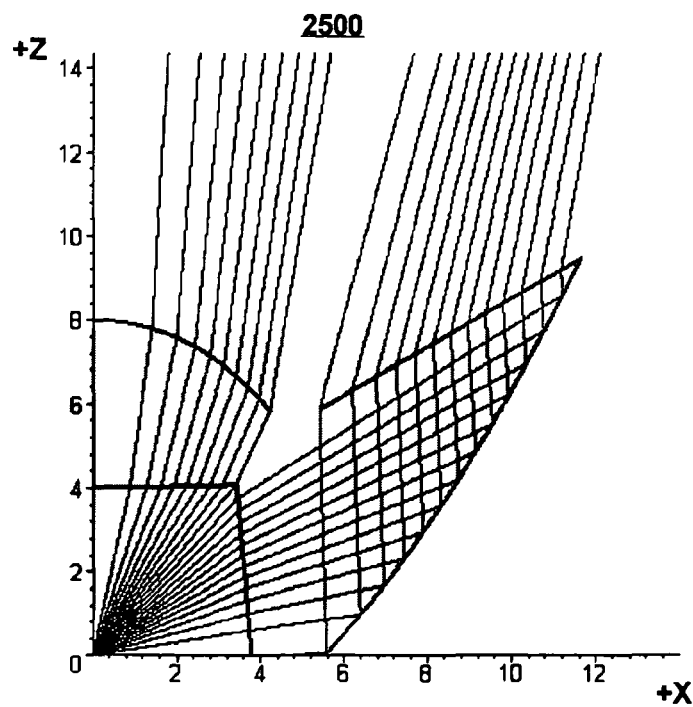
FIG. 25 is graph including the X-Z coordinate system and profiles of a lens similar to that shown in FIG. 18 but for producing a light distribution with a ~15 degree half angle width.

FIG. 25 shows a lens 2500 that is similar to that shown in FIG. 18 but for which phi3_max is 15 degrees as opposed to 35. Table VIII below gives information related to lens 2400.

TABLE VIII

| | |
|---|---|
| Phi1__MIN | 0.0 radians |
| Phi1__MAX | 1.57 radians (90 degrees) |
| Phi3__MIN | 0.0 radians |
| Phi3__MAX | 0.261 radians (15 degrees) |
| Phi__draft | −0.087 radians (−5.0 degrees) |
| Phi__exit | −0.523 radians (−30.0 degrees) |
| Phi1__switch | 0.698 radians (40.0 degrees) |
| rad__in(phi1) | FIG. 1 |
| rad__out(phi3) | cos(phi3)^(−3) (uniform on plane goal) |
| r1__ini | 4.0 |
| r2__ini | 8.0 |
| r2__w__ini | 15.0 |
| n1 | 1.0 |
| n2 | 1.497 (PMMA) |
| Phi__start | Phi1__min for DE1, DE2 Phi1__switch for DE5 |
| Calculated Transmission | 91.4% |

Note that both phi_exit and phi1_switch were decreased relative to the lens shown in FIG. 18. In choosing these and other parameters one goal is the minimize the overall size. Another goal is maintain high overall transmittance.

FIGS. 16-19, 21,23,25 illustrate a variety light distributions. Light distributions for approximately uniformly illuminating plane areas with half-angles (phi3_max) ranging from 15 to 65 degrees in 10 degree increments are shown.

According to embodiments described above EQU. 1 specifies a monotonic increasing relation between phi3 and phi1, i.e., as phi1 increases so does phi3. According to alternative embodiments of the invention rather than using EQU. 1 the following alternative is used:

$$\frac{\int_{\phi1\_MIN}^{\phi1} rad\_in(\phi1) \cdot 2\pi \cdot \sin(\phi1) d\phi1}{\int_{\phi1\_MIN}^{\phi1\_MAX} rad\_in(\phi1) \cdot 2\pi \cdot \sin(\phi1) d\phi1} = \frac{\int_{\phi3}^{\phi3\_MAX} rad\_out(\phi3) \cdot 2\pi \cdot \sin(\phi3) d\phi3}{\int_{\phi3\_MIN}^{\phi3\_MAX} rad\_out(\phi3) \cdot 2\pi \cdot \sin(\phi3) d\phi3}$$

EQU. 11

According to this alternative phi3 is a decreasing function of phi1. This alternative is generally not as good because it leads to higher average ray deflections (phi3-phi1) and thus more surface reflection losses. One possible use is in a lens that includes two or more portions including at least one defined using EQU. 1 and at least one defined using EQU. 11. For example a first portion of lens which covers a phi1 range from zero to an intermediate value of phi1 which bisects the light intensity output of the light source into two equal portions can be defined using EQU. 11 and a second portion of lens which covers a remaining phi1 range can be defined using EQU. 1. For both portions phi3_min can be set to zero and phi3_max to 45 degrees. Within both portions in the limit that phi1 approaches the intermediate value of phi1, the output ray angle phi3 will approach zero. Thus, the junctures between the surfaces at the intermediate angle can be continuous and smooth.

Whereas lenses defined using EQU. 1 or EQU. 11 serve to control the distribution of light flux (e.g., lumens per steradian), for some applications it is desirable to control the relation between phi3 and phi1 in a different way. In such cases rather than using EQU. 1 or EQU. 11 in integrating the lens equations one can use another relation, such as for example.

$$\phi3 = m \cdot \phi1$$ EQU. 12 where, m is a constant angular magnification factor.

Figure 26:
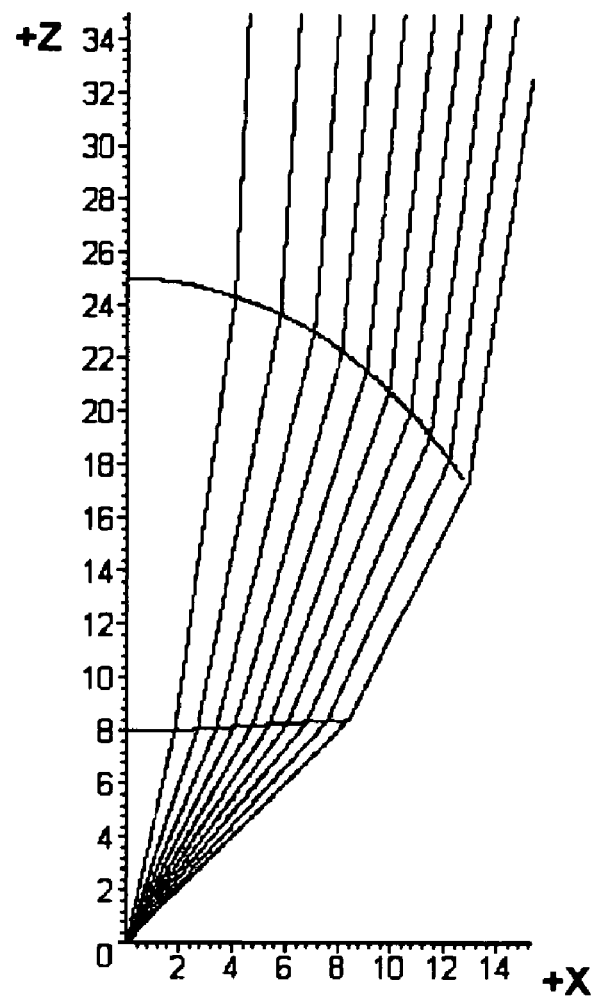
FIG. 26 shows the X-Z coordinate system with generatrices of lens that produces constant magnification.

FIG. 26 shows the X-Z coordinate system with generatrices of lens defined using phi3 giving by EQU. 12 with m=0.2 and DE1 and DE2.

Figure 27:
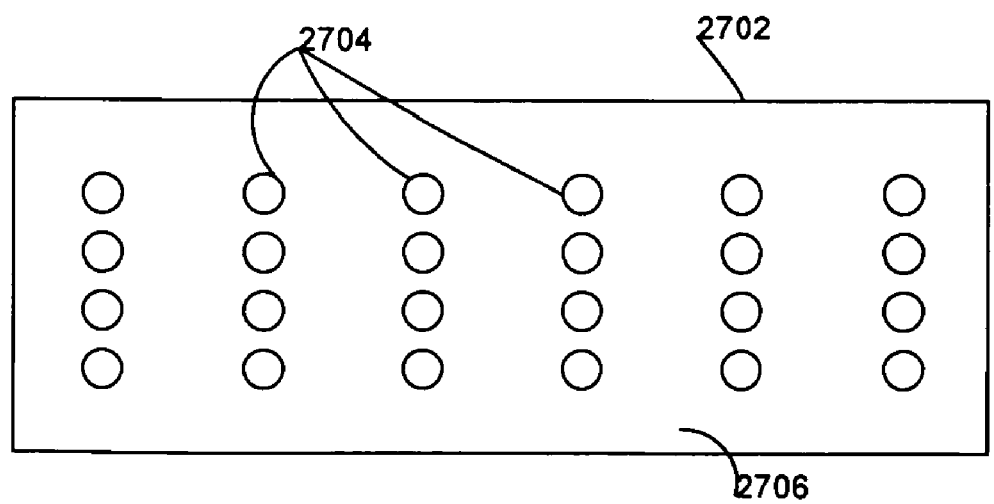
FIG. 27 is a plan view of an LED based fluorescent replacement fixture that includes an array of the lenses according to an embodiment of the invention.

FIG. 27 is a plan view of an LED based fluorescent replacement fixture 2702 that includes an array of the lenses 2704 (lead lines for only three are shown to avoid crowding the figure) defined by the differential equations given above. Each lens 2704 controls the light from a single LED chip or from a group of LED chips that are arranged close together, for example in a single LED package. The fixture also includes a power supply (not shown) for converting line power to power for the LEDs. The fixture may also include individual heat sinks (not shown) for each LED or LED package or a common heat sink. Heat sinks may be thermally coupled to a surface 2206 of the fixture in order to provide a larger area for dissipating heat.

Figure 28:
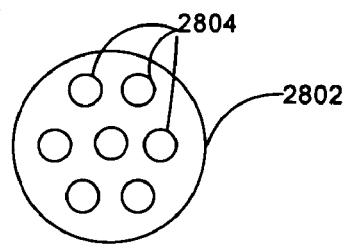
FIG. 28 is a plan view of a round recessed lighting fixture that uses several of the lenses according to an embodiment of the invention.

FIG. 28 is a plan view of a round (e.g., recessed, pendant, PAR replacement) lighting fixture 2802 that uses several of lenses 2804 defined by the differential equations given above (only three of which are numbered to avoid crowding the figure). Note that the lenses 2804 may or may not be recessed above the ceiling level. Recessed lighting fixtures are typically made in six and four inch diameter sizes. As in the preceding cases the fixture 2802 will also include a power supply not shown and a heat sink (not shown).

Figure 29:
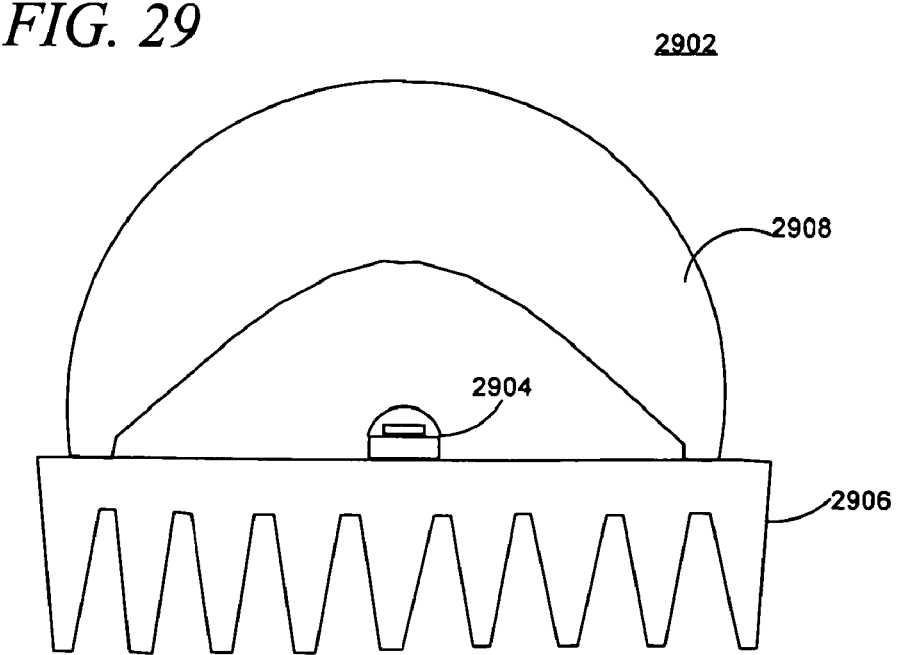
FIG. 29 shows a portion of an LED luminaire according to an embodiment of the invention.

FIG. 29 shows a portion of an LED luminaire 2902. The luminaire 2902 includes a packaged LED 2904 mounted on a heat sink 2906. A lens 2908 defined by DE1, DE2 and DE3 is also mounted on the heat sink 2906. The lens 2908 is located around the LED 2904 with the LED located at the focal point (X-Z coordinate system origin) of the lens 2908. Alternatively, unpackaged LED chip could be used. Alternatively, a lens defined in part by DE4 and/or DE5 could be used.

Figure 30:
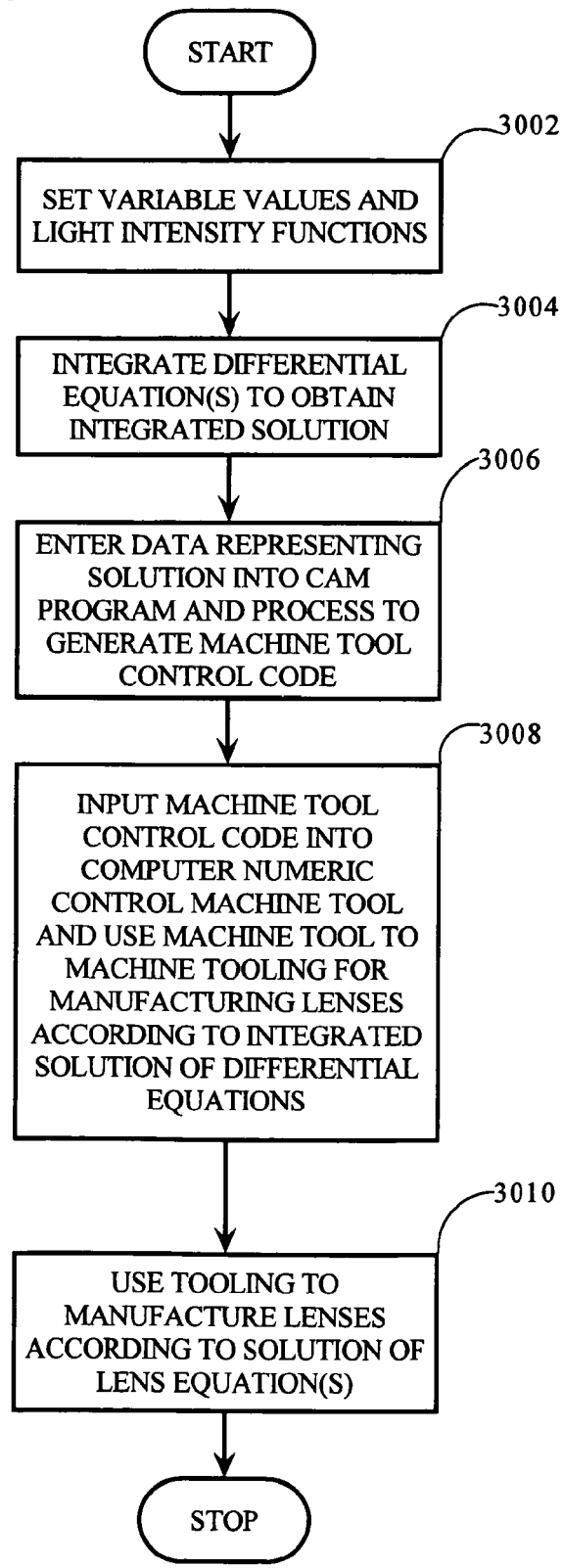
FIG. 30 is a flowchart of a method of making lenses according to embodiments of the invention.

FIG. 30 is a flowchart of a method 3000 of making lenses according embodiments of the present invention. In block 3002 the values of the variables and functions, as are listed in the tables above, are entered into a computer that is loaded with a differential equation integrator such the Runge Kutta routine, for example. In block 3004 a chosen subset of the differential equations DE1, DE2, DE3, DE4, DE5 are integrated to obtain an integrated solution. The integrated solution may be output as a series of points along each generatrix and optionally associated normal vectors for each point.

In block 3006 data representing the integrated solution is input in a Computer Aided Manufacturing (CAM) program and processed to generate machine tool control code.

In block 3008 the machine tool control code is entered into a Computer Numeric Control (CNC) machine tool used to machine tooling (e.g., mold inserts) for manufacturing lenses according to the integrated solutions. Although not shown in FIG. 30, the mold inserts will need to be hand polished (e.g., with a series of diamond pastes) before being used.

In block 3010 the tooling is used to manufacture lenses according to the integrated solutions.

Because the surfaces of the lens have smooth surfaces with few corners monotonic injection molding molds to make them can easily be turned and polished. Thus one can easily and relatively inexpensively (e.g., compared to the case of FIGS. 7,8, 9, 10, 14) make versions of the lens for each model of LED based on its light intensity distribution rad_in(phi1). Moreover, if a particularly useful LED exhibits significant unit-to-unit variations in the light intensity distribution rad_in (phi1) then the LEDs can be binned by light intensity distribution pattern and a version of the lens 1506 made for each bin. However, generally it will be sufficient to base rad_in (phi1) on an average of light intensity distributions for a particular light source.

According to alternative embodiments rather than use surfaces defined by sweeping the generatrices defined above through a full 360 degrees, the physical lenses are truncated.

For example the physical lens can be truncated at the X-Z plane, and a mirror positioned at the X-Z plane. The mirror will form an image of the LED, reflect substantially all the light into a 180 degree azimuthal range and the lens 1506 will then redirect the light as described above but within a limited azimuthal range.

In addition to general illumination the lenses described herein can be used for backlighting LCD displays. In backlighting applications the lenses taught herein can be combined with a collimating lens to collimate light distributed by the lenses taught herein. The associated collimating lens can be use smooth portions, fresnel portions and/or saw-tooth TIR portions.

Alternatively, a surface relief pattern can be added to one or more of the surfaces of the lens in order to provide a degree of diffusion, in this case the large scale profile of the lens surfaces 1502, 1504 is described by the equations given above, but there is a short scale, small amplitude variation added to the lens surface profiles.

Although the preferred and other embodiments of the invention have been illustrated and described, it will be apparent that the invention is not so limited. Numerous modifications, changes, variations, substitutions, and equivalents will occur to those of ordinary skill in the art without departing from the spirit and scope of the present invention as defined by the following claims.

The invention claimed is:

1. A lens comprising:
   first surface and a second surface wherein at least a portion of the first surface and a portion of the second surface have profiles that have large scale variation defined by a set of coupled differential equations defined in a polar coordinate system:

$$\frac{\partial}{\partial \phi 1} r1(\phi 1) = \frac{r1 n2 \sin\left(\frac{1}{2}\phi 1 - \frac{1}{2}\phi 3\right)}{n2 \cos\left(\frac{1}{2}\phi 1 - \frac{1}{2}\phi 3\right) - n1} \quad \text{DE1}$$

$$\frac{\partial}{\partial \phi 1} r2 = r2(\phi 1) \tan\left(\%3 - \arcsin\left(\frac{r1(\phi 1)\sin\%(4)}{r2(\phi 1)}\right)\right) \quad \text{DE2}$$

$$\left(\left(1 - \left(\frac{n1\cos(\%1)\%5}{(n2\cos(\%1) - n1)\sqrt{\%2}} + \frac{n1\sin(\%1)^2 n2 \%5}{(n2\cos(\%1) - n1)^2 \sqrt{\%2}} - \frac{1}{2}\frac{n1\sin(\%1)\left(2\frac{n2^2 \sin(\%1)\cos(\%1)\%5}{(n2\cos(\%1) - n1)^2} + 2\frac{n2^3 \sin(\%1)^3 \%5}{(n2\cos(\%1) - n1)^3}\right)}{\left((n2\cos(\%1) - n1)\%2^{\left(\frac{3}{2}\right)}\right)}\right)\bigg/ \sqrt{1 - \frac{n1^2 \sin(\%1)^2}{(n2\cos(\%1) - n1)^2 \%2}} + \right.$$

$$\frac{n2\cos(\%1)\%5}{n2\cos(\%1) - n1} + \frac{n2^2 \sin(\%1)^2 \%5}{(n2\cos(\%1) - n1)^2}}{\%2} - \left(\frac{\left(\frac{\partial}{\partial \phi 1} r1(\phi 1)\right)\sin(\%4)}{r2(\phi 1)} + r1(\phi 1)\cos(\%4)\right)\left(-\left(\frac{n1\cos(\%1)\%5}{(n2\cos(\%1) - n1)\sqrt{\%2}} + \frac{n1\sin(\%1)^2 n2 \%5}{(n2\cos(\%1) - n1)^2 \sqrt{\%2}} - \right.\right.$$

$$\frac{1}{2}\frac{\left(n1\sin(\%1)\left(2\frac{(n2^2 \sin(\%1)\cos(\%1)\%5)}{((n2\cos(\%1) - n1)^2)} + 2\frac{(n2^3 \sin(\%1)^3 \%5)}{((n2\cos(\%1) - n1)^3)}\right)\right)}{\left((n2\cos(\%1) - n1)\%2^{\left(\frac{3}{2}\right)}\right)}\bigg/ \sqrt{1 - \frac{n1^2 \sin(\%1)^2}{(n2\cos(\%1) - n1)^2 \%2}} + \frac{\left(\frac{n2\cos(\%1)\%5}{n2\cos(\%1) - n1} + \frac{(n2^2 \sin(\%1)^2 \%5)}{((n2\cos(\%1) - n1)^2)}\right)}{\%2}\right)\bigg/ r2(\phi 1)\bigg/$$

$$\sqrt{1 - \frac{r1(\phi 1)^2 \sin(\%4)^2}{r2(\phi 1)^2}}\right)\bigg/ \left(1 - \frac{\left(\tan\left(\%3 - \arcsin\left(\frac{r1(\phi 1)\sin(\%4)}{r2(\phi 1)}\right)\right)r1(\phi 1)\sin(\%4)\right)}{\left(r2(\phi 1)\sqrt{1 - \frac{(\phi 1)^2 \sin(\%4)^2}{r2(\phi 1)^2}}\right)}\right)$$

$$\%1 := -\frac{1}{2}\phi 1 + \frac{1}{2}\phi 3(\phi 1)$$

$$\%2 := 1 + \frac{n2^2 \sin(\%1)^2}{(n2\cos(\%1) - n1)^2}$$

$$\%3 := \arcsin\left(\frac{n1\sin(\%1)}{(n2\cos(\%1) - n1)\sqrt{\%2}}\right)$$

$$\%4 := -\%3 + \arctan\left(\frac{n2\sin(\%1)}{n2\cos(\%1) - n1}\right)$$

$$\%5 := -\frac{1}{2} + \frac{1}{2}\left(\frac{\partial}{\partial \phi 1}\phi 3(\phi 1)\right)$$

n2 is an index of refraction of the lens defined by the differential equations;
n1=1;
phi1 is a polar angular coordinate of the first lens surface;
phi3 is equal to a polar angle of a ray emitted at an origin of the polar coordinate system that was initially emitted at angle phi1 after said ray has been refracted by the second surface of the lens;
phi2 is a polar angular coordinate of the second lens surface and is given by:

where,
phi1_MIN and phi1_MAX are a lower polar angle limit and an upper polar angle limit respectively of light collected by said portion of said first surface;
phi3_MIN and phi3_MAX are the lower and upper limits respectively of a predetermined specified output light intensity distribution for the lens;
rad_in(phi1) is a light intensity distribution of a light source for which the lens is designed; and $$\phi 2 = \phi 1 + \arcsin\left(\frac{n1\sin(\%1)}{(-n2\cos(\%1)+n1)\sqrt{\frac{n2^2\sin(\%1)^2}{(-n2\cos(\%1)+n1)^2}+1}}\right) - \arctan\left(\frac{n2\sin(\%1)}{-n2\cos(\%1)+n1}\right) -$$
$$\arcsin\left(r1(\phi 1)\sin\left(\arcsin\left(\frac{(n1\sin(\%1))}{\left((-n2\cos(\%1)+n1)\sqrt{\frac{n2^2\sin(\%1)^2}{(-n2\cos(\%1)+n1)^2}+1}\right)}\right) - \arctan\left(\frac{n2\sin(\%1)}{-n2\cos(\%1)+n1}\right)\right) / r2(\phi 1)\right)$$

EQU. 2

$$\%1 := -\frac{1}{2}\phi 1 + \frac{1}{2}\phi 3(\phi 1)$$

$$\frac{\partial \phi 3}{\partial \phi 1} = \left(\frac{\text{rad\_out}(\phi 3) \cdot 2\pi \cdot \sin(\phi 3)}{\text{rad\_in}(\phi 1) \cdot 2\pi \cdot \sin(\phi 1)}\right) \cdot \left(\frac{\int_{\phi 1\_MIN}^{\phi 1\_MAX} \text{rad\_in}(\phi 1) \cdot 2\pi \cdot \sin(\phi 1)\, d\phi 1}{\int_{\phi 3\_MIN}^{\phi 3\_MAX} \text{rad\_out}(\phi 3) \cdot 2\pi \cdot \sin(\phi 3)\, d\phi 3}\right)$$

EQU. 3 with initial conditions r1_ini and r2_ini for r1(phi1) and r2 respectively.

2. The lens according to claim 1 wherein phi3 is given by:

$$\frac{\int_{\phi 1\_MIN}^{\phi 1} \text{rad\_in}(\phi 1) \cdot 2\pi \cdot \sin(\phi 1)\, d\phi 1}{\int_{\phi 1\_MIN}^{\phi 1\_MAX} \text{rad\_in}(\phi 1) \cdot 2\pi \cdot \sin(\phi 1)\, d\phi 1} = \frac{\int_{\phi 3\_MIN}^{\phi 3} \text{rad\_out}(\phi 3) \cdot 2\pi \cdot \sin(\phi 3)\, d\phi 3}{\int_{\phi 3\_MIN}^{\phi 3\_MAX} \text{rad\_out}(\phi 3) \cdot 2\pi \cdot \sin(\phi 3)\, d\phi 3}$$

rad_out(phi3) is said predetermined specified output light intensity distribution.

3. The lens according to claim 1 wherein the second lens surface includes a conical portion sloped at a draft angle phiD and the first lens surface has an additional portion defined by:

$$\frac{\partial}{\partial \phi 1} r1(\phi 1) = -\frac{r1 n2 \cos\left(\phi 1 - phiD + \arcsin\left(\frac{n1\cos(-\phi 3 + phiD)}{n2}\right)\right)}{n2\sin\left(\phi 1 - phiD + \arcsin\left(\frac{n1\cos(-\phi 3 + phiD)}{n2}\right)\right) - n1}.$$

DE3

4. The lens according to claim 1 wherein the first lens surface includes a conical portion sloped at a draft angle phiD and the second lens surface has an additional portion defined by:

$$\text{phi2\_d1} = \frac{1}{2}\pi + phiD - \arcsin\left(\frac{n1\cos(\phi 1 - phiD)}{n2}\right) - \arcsin\left(r1\_\text{switch}(\tan(phiD)\cos(phi1\_phiD) - \sin(phi1\_phiD))\right.$$
$$\left.\cos\left(\phi 1 - phiD + \arcsin\left(\frac{n1\cos(\phi 1 - phiD)}{n2}\right)\right)\right) / ((\tan(phiD\_\cos(\phi 1) - \sin(\phi 1))r2\_d1(\phi 1)))$$

and $$\frac{\partial}{\partial \phi 1} r2\_d1 = r2\_d1(\phi 1) \tan\left(\arctan\left(\frac{n1\cos(\phi 3 - phiD + \%2)}{n1\sin(\phi 3 - phiD + \%2) - n2}\right) - \arcsin\left(\frac{r1\_switch\%4\%3}{\%1 r2\_d1(\phi 1)}\right)\right) \quad \text{DE 4}$$

$$\left(\left(\frac{n1\sin(\phi 1 - phiD)}{n2\sqrt{1 - \frac{n1^2\cos(\phi 1 - phiD)^2}{n2^2}}} - \left(-\frac{r1\_switch\%4\%3(-\tan(phiD)\sin(\phi 1) - \cos(\phi 1))}{\%1^2 r2\_d1(\phi 1)}\right.\right.\right.$$

$$\left.\left.\left.- \frac{\left(r1\_switch\%4\sin(\phi 1 - phiD + \%2)\left(1 - \frac{n1\sin(\phi 1 - phiD)}{n2\sqrt{1 - \frac{n1^2\cos(\phi 1 - phiD)^2}{n2^2}}}\right)\right)}{\%1 r2\_d1(\phi 1)}\right) \bigg/ \sqrt{1 - \frac{r1\_switch^2\%4^2\%3^2}{\%1^2 r2\_d1(\phi 1)^2}}\right)\right/$$

$$\left(1 - \tan\left(\arctan\left(\frac{n1\cos(\phi 3 - phiD + \%2)}{n1\sin(\phi 3 - phiD + \%2) - n2}\right) - \arcsin\left(\frac{r1\_switch\%4\%3}{\%1 r2\_d1(\phi 1)}\right)\right) r1\_switch\%4\%3 \bigg/ \left(r2\_d1(\phi 1)\%1 \sqrt{1 - \frac{r1\_switch^2\%4^2\%3^2}{\%1^2 r2\_d1(\phi 1)^2}}\right)\right)$$

$\%1 := \tan(phiD)\cos(\phi 1) - \sin(\phi 1)$
$\%2 := \arcsin\left(\frac{n1\cos(\phi 1 - phiD)}{n2}\right)$
$\%3 := \cos(\phi 1 - phiD + \%2)$
$\%4 := \tan(phiD)\cos(phi1\_phiD) - \sin(phi1\_phiD)$ where, phi2_d1 is the polar angular coordinate of the additional portion of the second lens;

r2_d1 is the polar radial coordinate of the additional portion of the second lens surface;

phi1_phiD is a value of phi1 at which the first surface is sloped at phiD; and r1_switch is a polar radial coordinate of a point on the conical portion having the polar angular coordinate phi1_phiD.

5. The lens according to claim 1 further comprising a conical surface into which light enters the lens, an exit surface through which light exits the lens and a TIR surface that reflects light coming from the conical surface to the exit surface wherein said TIR surface is defined by:

$$phi2w = \frac{1}{2}\pi + phi\_draft - \arcsin\left(\frac{n1\cos(-\phi 1 + phi\_draft)}{n2}\right) -$$

$$\arcsin\left(r1\_switch(\tan(phi\_draft)\cos(phi1\_switch) - \right.$$

$$\sin(phi1\_switch))\cos\left(\phi 1 - phi\_draft + \arcsin\left(\frac{n1\cos(-\phi 1 + phi\_draft)}{n2}\right)\right) \bigg/$$

$$\left.((\tan(phi\_draft)\cos(\phi 1) - \sin(\phi 1)) r2\_w(\phi 1))\right)$$

and

-continued $$\frac{\partial}{\partial \phi 1} r2\_w = -r2\_w(\phi 1)\tan\left(\frac{1}{4}\pi - \frac{1}{2}\text{phi\_draft} + \frac{1}{2}\arcsin\left(\frac{n1\%2}{n2}\right) - \frac{1}{2}\arcsin\left(\frac{n1\sin(\text{phi\_exit}-\phi 3)}{n2}\right) + \frac{1}{2}\text{phi\_exit} + \arcsin\left(\frac{r1\_\text{switch}\%4\cos(\%3)}{\%1 r2\_w(\phi 1)}\right)\right) \quad \text{DE5}$$

$$\left(\left(-\frac{n1\sin(-\phi 1 + \text{phi\_draft})}{n2\sqrt{1 - \frac{n1^2\%2^2}{n2^2}}} - \frac{(r1\_\text{switch}\%4\cos(\%3)(-\tan(\text{phi\_draft})\sin(\phi 1) - \cos(\phi 1))}{(\%1^2 r2\_w(\phi 1))} - \frac{r1\_\text{switch}\%4\sin(\%3)\left(1 + \frac{n1\sin(-\phi 1 + \text{phi\_draft})}{n2\sqrt{1 - \frac{n1^2\%2^2}{n2^2}}}\right)}{\%1 r2\_w(\phi 1)}\right)\right/$$

$$\sqrt{1 - \frac{r1\_\text{switch}^2\%4^2\cos(\%3)^2}{\%1^2 r2\_w(\phi 1)^2}}\right)/$$

$$\left(1 + \tan\left(\frac{1}{4}\pi - \frac{1}{2}\text{phi\_draft} + \frac{1}{2}\arcsin\left(\frac{n1\%2}{n2}\right) - \frac{1}{2}\arcsin\left(\frac{n1\sin(\text{phi\_exit}-\phi 3)}{n2}\right) + \frac{1}{2}\text{phi\_exit} + \arcsin\left(\frac{r1\_\text{switch}\%4\cos(\%3)}{\%1 r2\_w(\phi 1)}\right)\right)\right.$$

$$\left. r1\_\text{switch}\%4\cos(\%3) \middle/ \left(r2\_w(\phi 1)\%1\sqrt{1 - \frac{r1\_\text{switch}^2\%4^2\cos(\%3)^2}{\%1^2 r2\_w(\phi 1)^2}}\right)\right)$$

$\%1 := \tan(\text{phi\_draft})\cos(\phi 1) - \sin(\phi 1)$
$\%2 := \cos(-\phi 1 + \text{phi\_draft})$
$\%3 := \phi 1 - \text{phi\_draft} + \arcsin\left(\frac{n1\%2}{n2}\right)$
$\%4 := \tan(\text{phi\_draft})\cos(phi1\_\text{switch}) - \sin(phi1\_\text{switch})$ r2_w is a polar radial coordinate of the TIR surface;
phi2*w* is a polar angular coordinate of the TIR surface;
r1_switch is a polar radial coordinate of a top of the conical surface;
phi1_switch is a polar angular coordinate of the top of the conical surface;
phi_draft is an angle of the conical surface measured in the clockwise direction from a positive Z-axis of the coordinate system,
phi_exit is an angle of a surface normal of the exit surface measured in the clockwise direction from the positive Z-axis,
with initial condition r2_w_ini.

6. The lens according to claim 2 wherein for at least a sub-range of phi3_MIN to phi3_MAX rad_out(phi3) is equal to a constant.

7. The lens according to claim 2 wherein for at least a sub-range of phi3_MIN to phi3_MAX $$\text{rad\_out}(\phi 3) = \frac{1}{(\cos(\phi 3))^e}.$$

8. The lens according to claim 1 wherein phi3 is given by:

$$\frac{\int_{\phi 1\_MIN}^{\phi 1} \text{rad\_in}(\phi 1) \cdot 2\pi \cdot \sin(\phi 1)\, d\phi 1}{\int_{\phi 1\_MIN}^{\phi 1\_MAX} \text{rad\_in}(\phi 1) \cdot 2\pi \cdot \sin(\phi 1)\, d\phi 1} = \frac{\int_{\phi 3\_MIN}^{\phi 3} \text{rad\_out}(\phi 3) \cdot 2\pi \cdot \sin(\phi 3)\, d\phi 3}{\int_{\phi 3\_MIN}^{\phi 3\_MAX} \text{rad\_out}(\phi 3) \cdot 2\pi \cdot \sin(\phi 3)\, d\phi 3}$$

where,
phi1_MIN and phi1_MAX are a lower polar angle limit and an upper polar angle limit respectively of light collected by said portion of said first surface;
phi3_MIN and phi3_MAX are the lower and upper limits respectively of a predetermined specified output light intensity distribution for the lens;
rad_in(phi1) is a light intensity distribution of a light source for which the lens is designed; and
rad_out(phi3) is said predetermined specified output light intensity distribution.

9. An illumination lens comprising a first lens surface and a second lens surface wherein the second lens surface includes a conical portion sloped at a draft angle phiD and the first lens surface has a portion defined in a polar coordinate system by a differential equation DE3:

$$\frac{\partial}{\partial \phi 1} r1(\phi 1) = -\frac{r1n2\cos\left(\phi 1 - phiD + \arcsin\left(\frac{n1\cos(-\phi 3 + phiD)}{n2}\right)\right)}{n2\sin\left(\phi 1 - phiD + \arcsin\left(\frac{n1\cos(-\phi 3 + phiD)}{n2}\right)\right) - n1}$$

where, n2 is an index of refraction of the illumination lens defined by the differential equation DE3;

n1=1;

phi1 is a polar angular coordinate of the first lens surface;

phi3 is equal to a polar angle of a ray emitted at an origin of the polar coordinate system that was initially emitted at angle phi1 after said ray has been refracted by the second surface of the lens where phi3 is related to phi1 by at least one relation selected from the group consisting of:

$$\frac{\int_{\phi 1\_MIN}^{\phi 1} \text{rad\_in}(\phi 1) \cdot 2\pi \cdot \sin(\phi 1) d\phi 1}{\int_{\phi 1\_MIN}^{\phi 1\_MAX} \text{rad\_in}(\phi 1) \cdot 2\pi \cdot \sin(\phi 1) d\phi 1} = \qquad \text{EQU. 1}$$

$$\frac{\int_{\phi 3\_MIN}^{\phi 3} \text{rad\_out}(\phi 3) \cdot 2\pi \cdot \sin(\phi 3) d\phi 3}{\int_{\phi 3\_MIN}^{\phi 3\_MAX} \text{rad\_out}(\phi 3) \cdot 2\pi \cdot \sin(\phi 3) d\phi 3}$$

and, $$\frac{\int_{\phi 1\_MIN}^{\phi 1} \text{rad\_in}(\phi 1) \cdot 2\pi \cdot \sin(\phi 1) d\phi 1}{\int_{\phi 1\_MIN}^{\phi 1\_MAX} \text{rad\_in}(\phi 1) \cdot 2\pi \cdot \sin(\phi 1) d\phi 1} = \qquad \text{EQU. 11}$$

$$\frac{\int_{\phi 3}^{\phi 3\_MAX} \text{rad\_out}(\phi 3) \cdot 2\pi \cdot \sin(\phi 3) d\phi 3}{\int_{\phi 3\_MIN}^{\phi 3\_MAX} \text{rad\_out}(\phi 3) \cdot 2\pi \cdot \sin(\phi 3) d\phi 3}$$

where, phi1_MIN and phi1_MAX are a lower polar angle limit and an upper polar angle limit respectively of light collected by said portion of said first surface;

phi3_MIN and phi3_MAX are the lower and upper limits respectively of a predetermined specified output light intensity distribution for the illumination;

rad_in(phi1) is a light intensity distribution of a light source for which the lens is designed; and rad_out(phi3) is said predetermined specified output light intensity distribution.

10. An illumination lens comprising a first lens surface and a second lens surface wherein the first lens surface includes a conical portion sloped at a draft angle phiD and the second lens surface has a portion defined in a polar coordinate system by an equation EQU. 6 in conjunction with a differential equation DE4:

EQU. 6

$$\text{phi2\_d1} = \frac{1}{2}\pi + phiD - \arcsin\left(\frac{n1\cos(\phi 1 - phiD)}{n2}\right) -$$

$$\arcsin\left(r1\_\text{switch}\left(\tan(phiD)\cos(\text{phi1\_phiD}) - \sin(\text{phi1\_phiD})\right)\cos\left(\phi 1 - phiD + \arcsin\left(\frac{n1\cos(\phi 1 - phiD)}{n2}\right)\right)\right/$$

$$\left((\tan(phiD)\cos(\phi 1) - \sin(\phi 1))r2\_d1(\phi 1))\right) \text{ and}$$

DE 4

$$\frac{\partial}{\partial \phi 1} r2\_d1 = r2\_d1(\phi 1)\tan\left(\arctan\left(\frac{n1\cos(\phi 3 - phiD + \%2)}{n1\sin(\phi 3 - phiD + \%2) - n2}\right) - \right.$$

$$\arcsin\left(\frac{r1\_\text{switch}\%4\%3}{\%1 r2\_d1(\phi 1)}\right)\right)\left(\frac{n1\sin(\phi 1 - phiD)}{n2\sqrt{1 - \frac{n1^2\cos(\phi 1 - phiD)^2}{n2^2}}} - \right.$$

$$\left( -\frac{r1\_\text{switch}\%4\%3(-\tan(phiD)\sin(\phi 1) - \cos(\phi 1))}{\%1^2 r2\_d1(\phi 1)} - \right.$$

$$\left. \frac{r1\_\text{switch}\%4\sin(\phi 1 - phiD + \%2)\left(1 - \frac{n1\sin(\phi 1 - phiD)^2}{n2\sqrt{1 - \frac{n1^2\cos(\phi 1 - phiD)^2}{n2^2}}}\right)}{(\%1 r2\_d1(\phi 1))}\right)/$$

-continued $$\sqrt{1-\frac{\text{r1\_switch}^2 \%4^2 \%3^2}{\%1^2 \text{r2\_d1}(\phi 1)^2}} \Bigg/ \Bigg(1-\tan\Bigg(\arctan\Bigg(\frac{n1\cos(\phi 3-phiD+\%2)}{n1\sin(\phi 3-phiD+\%2)-n2}\Bigg)-$$

$$\arcsin\Bigg(\frac{\text{r1\_switch}\%4\%3}{\%1\text{r2\_d1}(\phi 1)}\Bigg)\Bigg) \text{r1\_switch}\%4\%3 \Bigg/ \Bigg(\text{r2\_d1}(\phi 1)\%1 \sqrt{1-\frac{\text{r1\_switch}^2\%4^2\%3^2}{\%1^2\text{r2\_d1}(\phi 1)^2}}\Bigg)\Bigg)$$

$\%1 := \tan(phiD)\cos(\phi 1) - \sin(\phi 1)$ $\%2 := \arcsin\left(\frac{n1\cos(\phi 1 - phiD)}{n2}\right)$ $\%3 := \cos(\phi 1 - phiD + \%2)$ $\%4 := \tan(phiD)\cos(\text{phi1\_phiD}) - \sin(\text{phi1\_phiD})$ where,
- n2 is an index of refraction of the illumination lens defined by the differential equation EQU. 6 and DE4;
- n1=1;
- phi1 is a polar angular coordinate of the first lens surface and an independent variable for EQU. 6 and DE4;
- phi2_d1 is the polar angular coordinate of the portion of the second lens;
- r2_d1 is the polar radial coordinate of the portion of the second lens surface;
- phi1_phiD is a value of phi1 at which the first surface is sloped at phiD; and
- r1_switch is a polar radial coordinate of a point on the conical portion having the polar angular coordinate phi1_phiD
- phi3 is equal to a polar angle of a ray emitted at an origin of the polar coordinate system that was initially emitted at angle phi1 after said ray has been refracted by the second surface of the lens and phi3 is related to phi1 by at least one relation selected from the group consisting of:

$$\frac{\int_{\phi 1\_MIN}^{\phi 1} \text{rad\_in}(\phi 1) \cdot 2\pi \cdot \sin(\phi 1) d\phi 1}{\int_{\phi 1\_MIN}^{\phi 1\_MAX} \text{rad\_in}(\phi 1) \cdot 2\pi \cdot \sin(\phi 1) d\phi 1} = \frac{\int_{\phi 3\_MIN}^{\phi 3} \text{rad\_out}(\phi 3) \cdot 2\pi \cdot \sin(\phi 3) d\phi 3}{\int_{\phi 3\_MIN}^{\phi 3\_MAX} \text{rad\_out}(\phi 3) \cdot 2\pi \cdot \sin(\phi 3) d\phi 3} \quad \text{EQU. 1}$$

and, $$\frac{\int_{\phi 1\_MIN}^{\phi 1} \text{rad\_in}(\phi 1) \cdot 2\pi \cdot \sin(\phi 1) d\phi 1}{\int_{\phi 1\_MIN}^{\phi 1\_MAX} \text{rad\_in}(\phi 1) \cdot 2\pi \cdot \sin(\phi 1) d\phi 1} = \frac{\int_{\phi 3}^{\phi 3\_MAX} \text{rad\_out}(\phi 3) \cdot 2\pi \cdot \sin(\phi 3) d\phi 3}{\int_{\phi 3\_MIN}^{\phi 3\_MAX} \text{rad\_out}(\phi 3) \cdot 2\pi \cdot \sin(\phi 3) d\phi 3} \quad \text{EQU. 11}$$

where,
- phi1_MIN and phi1_MAX are a lower polar angle limit and an upper polar angle limit respectively of light collected by said portion of said first surface;
- phi3_MIN and phi3_MAX are the lower and upper limits respectively of a predetermined specified output light intensity distribution for the illumination;
- rad_in(phi1) is a light intensity distribution of a light source for which the lens is designed; and
- rad_out(phi3) is said predetermined specified output light intensity distribution.

11. An illumination lens comprising a conical surface through which light enters the lens, an exit surface through which light exits the lens and a TIR surface that reflects light coming from the conical surface to the exit surface wherein said TIR surface is defined by:

$$phi2w = \frac{1}{2}\pi + \text{phi\_draft} - \arcsin\left(\frac{n1\cos(\phi 1 + \text{phi\_draft})}{n2}\right) - \quad \text{EQU. 9}$$

$$\arcsin\Bigg(\text{r1\_switch}\Big(\tan(\text{phi\_draft})\cos(\text{phi1\_switch}) - \sin(\text{phi1\_switch})\Big)\cos\Bigg(\phi 1 - \text{phi\_draft} +$$

$$\arcsin\left(\frac{n1\cos(\phi 1 - \text{phi\_draft})}{n2}\right)\Bigg) \Bigg/ \Big((\tan(\text{phi\_draft})\cos(\phi 1) - \sin(\phi 1))\text{r2\_w}(\phi 1)\Big)\Bigg) \text{ and}$$

DE5

-continued $$\frac{\partial}{\partial \phi 1} r2\_w = r2\_w(\phi 1)\tan\left(\frac{1}{4}\pi - \frac{1}{2}\text{phi\_draft} + \frac{1}{2}\arcsin\left(\frac{n1\%2}{n2}\right) - \frac{1}{2}\arcsin\left(\frac{n1\sin(\text{phi\_exit} - \phi 3)}{n2}\right) +$$

$$\frac{1}{2}\text{phi\_exit} + \arcsin\left(\frac{\text{r1\_switch}\%4\cos(\%3)}{\%1\text{r2\_w}(\phi 1)}\right)\Bigg) - \frac{n1\sin(-\phi 1 + \text{phi\_draft})}{n2\sqrt{1 - \frac{n1^2\%2^2}{n2^2}}} -$$

$$\left(-\frac{\text{r1\_switch}\%4\cos(\%3)(-\tan(\text{phi\_draft})\sin(\phi 1) - \cos(\phi 1))}{\%1^2\text{r2\_w}(\phi 1)} - \right.$$

$$\left.\frac{\text{r1\_switch}\%4\sin(\%3)\left(1 + \frac{n1\sin(-\phi 1 + \text{phi\_draft})}{n2\sqrt{1 - \frac{n1^2\%2^2}{n2^2}}}\right)}{\%1\text{r2\_w}(\phi 1)}\right) \Bigg/ \left(1 + \right.$$

$$\tan\left(\frac{1}{4}\pi - \frac{1}{2}\text{phi\_draft} + \frac{1}{2}\arcsin\left(\frac{n1\%2}{n2}\right) - \frac{1}{2}\arcsin\left(\frac{n1\sin(\text{phi\_exit} - \phi 3)}{n2}\right) + \frac{1}{2}\text{phi\_exit} +$$

$$\arcsin\left(\frac{\text{r1\_switch}\%4\cos(\%3)}{\%1\text{r2\_w}(\phi 1)}\right)\Bigg)\text{r1\_switch}\%4\cos(\%3) \Bigg/$$

$$\left(r2\_w(\phi 1)\%1\sqrt{1 - \frac{\text{r1\_switch}^2\%4^2\cos(\%3)^2}{\%1^2\text{r2\_w}(\phi 1)^2}}\right)\Bigg)$$

$\%1 := \tan(\text{phi\_draft})\cos(\phi 1) - \sin(\phi 1)$ $\%2 := \cos(-\phi 1 + \text{phi\_draft})$ $\%3 := \phi 1 - \text{phi\_draft} + \arcsin\left(\frac{n1\%2}{n2}\right)$ $\%4 := \tan(\text{phi\_draft})\cos(\text{phi1\_switch}) - \sin(\text{phi1\_switch})$ r2_w is a polar radial coordinate of the TIR surface;
phi2w is a polar angular coordinate of the TIR surface;
r1_switch is a polar radial coordinate of a top of the conical surface;
phi1_switch is a polar angular coordinate of the top of the conical surface;
phi_draft is an angle of the conical surface measured in the clockwise direction from a positive Z-axis of the coordinate system;
phi_exit is an angle of a surface normal of the exit surface measured in the clockwise direction from the positive Z-axis,
with initial condition r2_w_ini;
phi3 is equal to a polar angle of a ray emitted at an origin of the polar coordinate system that was initially emitted at angle phi1 after said ray has been deflected by the lens; and
phi3 is related to phi1 by at least one equation selected from the group consisting of:

$$\frac{\int_{\phi 1\_MIN}^{\phi 1} \text{rad\_in}(\phi 1) \cdot 2\pi \cdot \sin(\phi 1) d\phi 1}{\int_{\phi 1\_MIN}^{\phi 1\_MAX} \text{rad\_in}(\phi 1) \cdot 2\pi \cdot \sin(\phi 1) d\phi 1} = \frac{\int_{\phi 3\_MIN}^{\phi 3} \text{rad\_out}(\phi 3) \cdot 2\pi \cdot \sin(\phi 3) d\phi 3}{\int_{\phi 3\_MIN}^{\phi 3\_MAX} \text{rad\_out}(\phi 3) \cdot 2\pi \cdot \sin(\phi 3) d\phi 3}$$ EQU. 1 and, $$\frac{\int_{\phi 1\_MIN}^{\phi 1} \text{rad\_in}(\phi 1) \cdot 2\pi \cdot \sin(\phi 1) d\phi 1}{\int_{\phi 1\_MIN}^{\phi 1\_MAX} \text{rad\_in}(\phi 1) \cdot 2\pi \cdot \sin(\phi 1) d\phi 1} = \frac{\int_{\phi 3}^{\phi 3\_MAX} \text{rad\_out}(\phi 3) \cdot 2\pi \cdot \sin(\phi 3) d\phi 3}{\int_{\phi 3\_MIN}^{\phi 3\_MAX} \text{rad\_out}(\phi 3) \cdot 2\pi \cdot \sin(\phi 3) d\phi 3}$$ EQU. 11 where, phi1_MIN and phi1_MAX are a lower polar angle limit and an upper polar angle limit respectively of light collected by lens;

phi3_MIN and phi3_MAX are the lower and upper limits respectively of a predetermined specified output light intensity distribution;

rad_in(phi1) is a light intensity distribution of a light source for which the lens is designed; and rad_out(phi3) is said predetermined specified output light intensity distribution.

12. A method of making a lens comprising:

integrating at least one differential equation selected from the group consisting of:

DE1
$$\frac{\partial}{\partial \phi 1} r1(\phi 1) = \frac{r1 n2 \sin\left(\frac{1}{2}\phi 1 - \frac{1}{2}\phi 3\right)}{n2\cos\left(\frac{1}{2}\phi 1 - \frac{1}{2}\phi 3\right) - n1},$$

DE2
$$\frac{\partial}{\partial \phi 1} r2 = r2(\phi 1)\tan\left(\%3 - \arcsin\left(\frac{r1(\phi 1)\sin(\%4)}{r2(\phi 1)}\right)\right)\left(1 - \left(\frac{n1\cos(\%1)\%5}{(n2\cos(\%1) - n1)\sqrt{\%2}} + \frac{n1\sin(\%1)^2 n2\%5}{(n2\cos(\%1) - n1)^2\sqrt{\%2}} - \right.\right.$$

$$\left.\frac{1}{2}\frac{n1\sin(\%1)\left(2\frac{n2^2\sin(\%1)\cos(\%1)\%5}{(n2\cos(\%1) - n1)^2} + 2\frac{n2^3\sin(\%1)^3\%5}{(n2\cos(\%1) - n1)^3}\right)}{\left(\frac{3}{2}\right)}\right/$$

$$(n2\cos(\%1) - n1)\%2\sqrt{1 - \frac{n1^2\sin(\%1)^2}{(n2\cos(\%1) - n1)^2\%2}} + \frac{\frac{n2\cos(\%1)\%5}{n2\cos(\%1) - n1} + \frac{n2^2\sin(\%1)^2\%5}{(n2\cos(\%1) - n1)^2}}{\%2} -$$

$$\left(\frac{\left(\frac{\partial}{\partial \phi 1} r1(\phi 1)\right)\sin(\%4)}{r2(\phi 1)} + r1(\phi 1)\cos(\%4)\right)\left(-\left(\frac{n1\cos(\%1)\%5}{(n2\cos(\%1) - n1)\sqrt{\%2}} + \frac{n1\sin(\%1)^2 n2\%5}{(n2\cos(\%1) - n1)^2\sqrt{\%2}} - \right.\right.$$

$$\left.\frac{1}{2}\frac{n1\sin(\%1)\left(2\frac{n2^2\sin(\%1)\cos(\%1)\%5}{(n2\cos(\%1) - n1)^2} + 2\frac{n2^3\sin(\%1)^3\%5}{(n2\cos(\%1) - n1)^3}\right)}{\left(\frac{3}{2}\right)}\right/$$

$$(n2\cos(\%1) - n1)\%2\sqrt{1 - \frac{n1^2\sin(\%1)^2}{(n2\cos(\%1) - n1)^2\%2}} +$$

$$\left.\frac{\frac{n2\cos(\%1)\%5}{n2\cos(\%1) - n1} + \frac{n2^2\sin(\%1)^2\%5}{(n2\cos(\%1) - n1)^2}}{\%2}\right/ r2(\phi 1) \right/ \sqrt{1 - \frac{r1(\phi 1)^2 \sin(\%4)^2}{r2(\phi 1)^2}} \right/$$

$$\left(1 - \frac{\tan\left(\%3 - \arcsin\left(\frac{r1(\phi 1)\sin(\%4)}{r2(\phi 1)}\right)\right) r1(\phi 1)\sin(\%4)}{r2(\phi 1)\sqrt{1 - \frac{r1(\phi 1)^2 \sin(\%4)^2}{r2(\phi 1)^2}}}\right)$$

$$\%1 := -\frac{1}{2}\phi 1 + \frac{1}{2}\phi 3(\phi 1)$$

$$\%2 := 1 + \frac{n2^2\sin(\%1)^2}{(n2\cos(\%1) - n1)^2}$$

$$\%3 := \arcsin\left(\frac{n1\sin(\%1)^2}{(n2\cos(\%1) - n1)\sqrt{\%2}}\right)$$

$$\%4 := -\%3 + \arctan\left(\frac{n2\sin(\%1)^2}{n2\cos(\%1) - n1}\right)$$

$$\%5 := -\frac{1}{2} + \frac{1}{2}\left(\frac{\partial}{\partial \phi 1}\phi 3(\phi 1)\right)$$

n2 is an index of refraction of the lens defined by the differential equations;

n1=1;

phi1 is a polar angular coordinate of the first lens surface;

phi3 is equal to a polar angle of a ray emitted at an origin of the polar coordinate system that was initially emitted at angle phi1 after said ray has been refracted by the second surface of the lens;

phi2 is a polar angular coordinate of the second lens surface and is given by:

$$\phi 2 = \phi 1 + \arcsin\left(\frac{n1\sin(\%1)}{(-n2\cos(\%1)+n1)\sqrt{\frac{n2^2\sin(\%1)^2}{(-n2\cos(\%1)+n1)^2}+1}}\right) - \arctan\left(\frac{n2\sin(\%1)}{-n2\cos(\%1)+n1}\right) - \arcsin\left(r1(\phi 1)\sin\left(\arcsin\left(\frac{(n1\sin(\%1))}{(-n2\cos(\%1)+n1)\sqrt{\frac{n2^2\sin(\%1)^2}{(-n2\cos(\%1)+n1)^2}+1}}\right) - \arctan\left(\frac{n2\sin(\%1)}{-n2\cos(\%1)+n1}\right)\right)/r2(\phi 1)\right)$$

EQU. 2

$$\%1 := -\frac{1}{2}\phi 1 + \frac{1}{2}\phi 3(\phi 1)$$

$$\frac{\partial \phi 3}{\partial \phi 1} = \left(\frac{\mathrm{rad\_out}(\phi 1) \cdot 2\pi \cdot \sin(\phi 1)}{\mathrm{rad\_in}(\phi 3) \cdot 2\pi \cdot \sin(\phi 3)}\right) \cdot \left(\frac{\int_{\phi 3\_MIN}^{\phi 3\_MAX} \mathrm{rad\_in}(\phi 3) \cdot 2\pi \cdot \sin(\phi 3)\, d\phi 3}{\int_{\phi 1\_MIN}^{\phi 1\_MAX} \mathrm{rad\_out}(\phi 1) \cdot 2\pi \cdot \sin(\phi 1)\, d\phi 1}\right)$$

EQU. 3 with initial conditions r1_ini and r2_ini for r1 (phi1) and r2 respectively, $$\frac{\partial}{\partial \phi 1} r1(\phi 1) = -\frac{r1 n2\cos\left(\phi 1 - phiD + \arcsin\left(\frac{n1\cos(-\phi 3 + phiD)}{n2}\right)\right)}{n2\sin\left(\phi 1 - phiD + \arcsin\left(\frac{n1\cos(-\phi 3 + phiD)}{n2}\right)\right) - n1},$$

DE3

$$\frac{\partial}{\partial \phi 1} r2\_d1 = r2\_d1(\phi 1)\tan\left(\arctan\left(\frac{n1\cos(\phi 3 - phiD + \%2)}{n1\sin(\phi 3 - phiD + \%2) - n2}\right) - \right.$$

DE4

$$\arcsin\left(\frac{r1\_switch\%4\%3}{\%1 r2\_d1(\phi 1)}\right)\right)\left(\frac{n1\sin(\phi 1 - phiD)}{n2\sqrt{1 - \frac{n1^2\cos(\phi 1 - phiD)^2}{n2^2}}} - \frac{r1\_switch\%4\%3(-\tan(phiD)\sin(\phi 1) - \cos(\phi 1))}{\%1^2 r2\_d1(\phi 1)} - \right.$$

$$\left.\frac{r1\_switch\%4\sin(\phi 1 - phiD + \%2)\left(1 - \frac{n1\sin(\phi 1 - phiD)}{n2\sqrt{1 - \frac{n1^2\cos(\phi 1 - phiD)^2}{n2^2}}}\right)}{(\%1 r2\_d1(\phi 1))}\right)/$$

$$\sqrt{1 - \frac{r1\_switch^2\%4^2\%3^2}{\%1^2 r2\_d1(\phi 1)^2}}\Bigg)/$$

$$\left(1 - \tan\left(\arctan\left(\frac{n1\cos(\phi 3 - phiD + \%2)}{n1\sin(\phi 3 - phiD + \%2) - n2}\right) - \arcsin\left(\frac{r1\_switch\%4\%3}{\%1 r2\_d1(\phi 1)}\right)\right)\right) r1\_switch\%4\%3 \Bigg/$$

$$\left(r2\_d1(\phi 1)\%1 \sqrt{1 - \frac{r1\_switch^2 \%4^2 \%3^2}{\%1^2 r2\_d1(\phi 1)^2}}\right) \Bigg)$$

$\%1 := \tan(phiD)\cos(\phi 1) - \sin(\phi 1)$ $\%2 := \arcsin\left(\dfrac{n1\cos(\phi 1 - phiD)}{n2}\right)$ $\%3 := \cos(\phi 1 - phiD + \%2)$ $\%4 := \tan(phiD)\cos(phi1\_phiD) - \sin(phi1\_phiD)$ where, phi2_d1 is the polar angular coordinate of the additional portion of the second lens;
r2_d1 is the polar radial coordinate of the additional portion of the second lens surface;
phi1_phiD is a value of phi1 at which the first surface is sloped at phiD; and r1_switch is a polar radial coordinate of a point on the conical portion having the polar angular coordinate phi1_phiD and $$\frac{\partial}{\partial \phi 1} r2\_w = -r2\_w(\phi 1)\tan\left(\frac{1}{4}\pi - \frac{1}{2}phi\_draft + \frac{1}{2}\arcsin\left(\frac{n1\%2}{n2}\right) - \frac{1}{2}\arcsin\left(\frac{n1\sin(phi\_exit - \phi 3)}{n2}\right) + \frac{1}{2}phi\_exit + \arcsin\left(\frac{r1\_switch\ \%4\cos(\%3)}{\%1 r2\_w(\phi 1)}\right)\right) \quad \text{DE5}$$

$$\Bigg(\Bigg(-\frac{n1\sin(-\phi 1 + phi\_draft)}{n2\sqrt{1 - \frac{n1^2 \%2^2}{n2^2}}} - \Bigg(\frac{(r1\_switch\ \%4\cos(\%3)(-\tan(phi\_draft)\sin(\phi 1) - \cos(\phi 1)))}{\%1^2 r2\_w(\phi 1)} - $$

$$\frac{r1\_switch\ \%4\sin(\%3)\left(1 + \dfrac{n1\sin(-\phi 1 + phi\_draft)}{n2\sqrt{1 - \frac{n1^2 \%2^2}{n2^2}}}\right)}{\%1 r2\_w(\phi 1)}\Bigg)\Bigg/\sqrt{1 - \frac{r1\_switch^2 \%4^2 \cos(\%3)^2}{\%1^2 r2\_w(\phi 1)^2}}\Bigg)\Bigg/$$

$$\left(1 + \tan\left(\frac{1}{4}\pi - \frac{1}{2}phi\_draft + \frac{1}{2}\arcsin\left(\frac{n1\%2}{n2}\right) - \frac{1}{2}\arcsin\left(\frac{n1\sin(phi\_exit - \phi 3)}{n2}\right) + \frac{1}{2}phi\_exit + \arcsin\left(\frac{r1\_switch\ \%4\cos(\%3)}{\%1 r2\_w(\phi)}\right)\right)\right)$$

$$r1\_switch\ \%4\cos(\%3) \Bigg/ \left(r2\_w(\phi 1)\%1 \sqrt{1 - \frac{r1\_switch^2\ \%4^2\cos(\%3)^2}{\%1^2 r2\_w(\phi 1)^2}}\right)\Bigg)$$

$\%1 := \tan(phi\_draft)\cos(\phi 1) - \sin(\phi 1)$ $\%2 := \cos(-\phi 1 + phi\_draft)$ $\%3 := \phi 1 - phi\_draft + \arcsin\left(\dfrac{n1\%2}{n2}\right)$ $\%4 := \tan(phi\_draft)\cos(phi1\_switch) - \sin(phi1\_switch)$ r2_w is a polar radial coordinate of the TIR surface;
phi2w is a polar angular coordinate of the TIR surface;
r1_switch is a polar radial coordinate of a top of the conical surface;
phi1_switch is a polar angular coordinate of the top of the conical surface;
phi_draft is an angle of the conical surface measured in the clockwise direction from a positive Z-axis of the coordinate system, phi_exit is an angle of a surface normal of the exit surface measured in the clockwise direction from the positive Z-axis, with initial condition r2_w_ini
to obtain at least one lens surface generatrix;
   producing a mold that is shaped according to the at least one lens surface generatrix; and
   producing lenses using the mold.

* * * * *